(12) United States Patent
Yokokawa et al.

(10) Patent No.: US 11,330,191 B2
(45) Date of Patent: May 10, 2022

(54) IMAGE PROCESSING DEVICE AND IMAGE PROCESSING METHOD TO GENERATE ONE IMAGE USING IMAGES CAPTURED BY TWO IMAGING UNITS

(71) Applicant: SONY CORPORATION, Tokyo (JP)

(72) Inventors: Masatoshi Yokokawa, Tokyo (JP); Hideyuki Ichihashi, Tokyo (JP); Yiwen Zhu, Tokyo (JP); Tomohiro Nishi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/052,657

(22) PCT Filed: Apr. 23, 2019

(86) PCT No.: PCT/JP2019/017314
§ 371 (c)(1),
(2) Date: Nov. 3, 2020

(87) PCT Pub. No.: WO2019/220890
PCT Pub. Date: Nov. 21, 2019

(65) Prior Publication Data
US 2021/0243351 A1     Aug. 5, 2021

(30) Foreign Application Priority Data

May 15, 2018   (JP) .............................. JP2018-093748

(51) Int. Cl.
*H04N 5/235*     (2006.01)
*G06T 7/80*     (2017.01)
(Continued)

(52) U.S. Cl.
CPC ........... *H04N 5/2355* (2013.01); *G06T 5/009* (2013.01); *G06T 7/80* (2017.01); *H04N 5/2351* (2013.01);
(Continued)

(58) Field of Classification Search
CPC .. H04N 5/2355; H04N 5/2351; H04N 5/2354; H04N 5/23296; H04N 5/23245; H04N 5/23238; G06T 5/009; G06T 7/80
See application file for complete search history.

(56) References Cited

U.S. PATENT DOCUMENTS 9,473,708 B1 *  10/2016  D'Amico ............. H04N 13/239
2005/0168830 A1   9/2005  Segawa et al.
(Continued)

FOREIGN PATENT DOCUMENTS

JP     2008-175897 A      7/2008
JP     2008-249782 A     10/2008
(Continued)

OTHER PUBLICATIONS

International Search Report and Written Opinion of PCT Application No. PCT/JP2019/017314, dated Jun. 18, 2019, 06 pages of ISRWO.

(Continued)

*Primary Examiner* — Padma Haliyur
(74) *Attorney, Agent, or Firm* — Chip Law Group

(57) ABSTRACT

Provided is an image processing device that includes a wide image capturing unit which captures an image of a wide viewing angle, a tele image capturing unit which captures an image of a narrow viewing angle, and an image processing unit which receives an input of the captured images of the respective imaging units and executes signal processing. In a case where a wide conversion lens is attached to the tele image capturing unit, the image processing unit executes any one of a high-sensitivity image generation processing, a HDR image generation processing, or a high-resolution image generation processing based on the captured images of the wide image capturing unit and the tele image capturing unit according to a situation at the time of imaging with (Continued)

a wide conversion lens attachment detection unit which detects whether the wide conversion lens is attached.

12 Claims, 18 Drawing Sheets

(51) Int. Cl.
  *G06T 5/00* (2006.01)
  *H04N 5/232* (2006.01)
(52) U.S. Cl.
  CPC ....... *H04N 5/2354* (2013.01); *H04N 5/23238* (2013.01); *H04N 5/23245* (2013.01); *H04N 5/23296* (2013.01)

(56) References Cited

U.S. PATENT DOCUMENTS

| | | | |
|---|---|---|---|
| 2006/0018511 A1* | 1/2006 | Stam | B60Q 1/085 382/104 |
| 2008/0239135 A1 | 10/2008 | Tamur | |
| 2011/0018970 A1* | 1/2011 | Wakabayashi | H04N 5/232123 348/47 |
| 2011/0242346 A1* | 10/2011 | Ego | H04N 5/23293 348/222.1 |
| 2018/0048825 A1 | 2/2018 | Wang | |
| 2018/0152640 A1* | 5/2018 | Shabtay | G02B 13/009 |
| 2020/0378759 A1* | 12/2020 | Suto | G03B 35/08 |
| 2021/0243351 A1 | 8/2021 | Yokokawa et al. | |

FOREIGN PATENT DOCUMENTS

| | | |
|---|---|---|
| JP | 2010-170340 A | 8/2010 |
| JP | 2011-199716 A | 10/2011 |
| JP | 2012-083685 A | 4/2012 |
| JP | 2016-527734 A | 9/2016 |
| KR | 10-2011-0045549 A | 5/2011 |
| WO | 2012/147496 A1 | 7/2014 |
| WO | 2016/052420 A1 | 4/2016 |

OTHER PUBLICATIONS

Office Action for CN Patent Application No. 2019800309586, dated Dec. 3, 2021, 18 pages of Office Action.

* cited by examiner

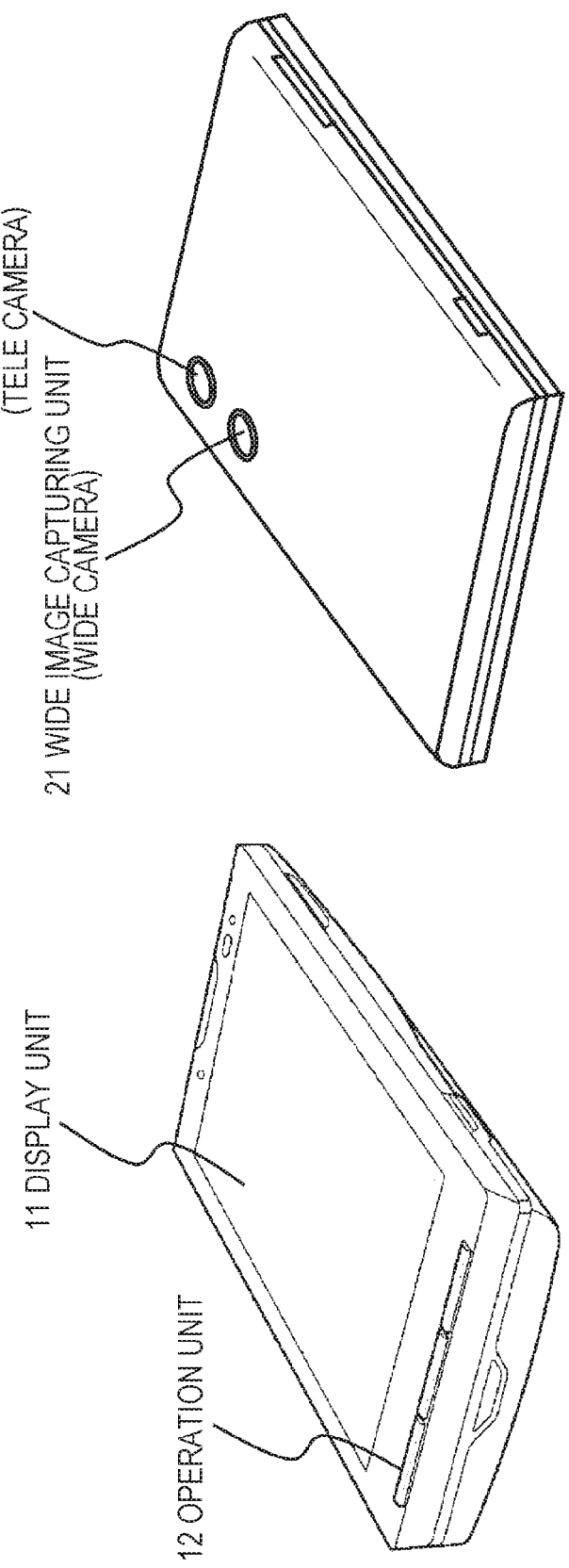

FIG. 2B  EXAMPLE OF CAPTURED IMAGE OF TELE IMAGE CAPTURING UNIT (TELEPHOTO CAPTURED IMAGE)
FIG. 2A  EXAMPLE OF CAPTURED IMAGE OF WIDE IMAGE CAPTURING UNIT (WIDE ANGLE CAPTURED IMAGE)

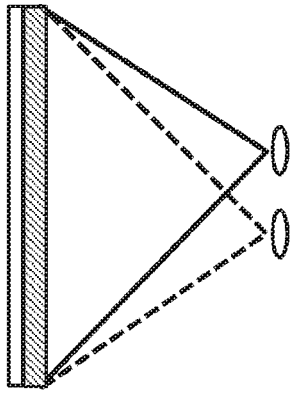

FIG. 3B SAME VIEWING ANGLE COMPOUND EYE CAMERA

PROCESSING WHICH MAY BE EXECUTED (B1) HIGH-RESOLUTION IMAGE GENERATION
(B2) HIGH-SENSITIVITY IMAGE GENERATION
(B3) HDR IMAGE GENERATION
(B4) DEPTH (DISTANCE) MEASUREMENT (MEASURABLE RANGE IS WIDE)

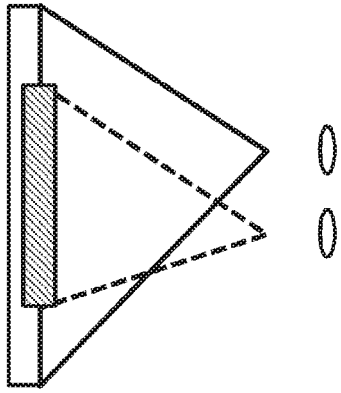

FIG. 3A TELE/WIDE COMPOUND EYE CAMERA

PROCESSING WHICH MAY BE EXECUTED (A1) ZOOM PROCESSING
(A2) DEPTH (DISTANCE) MEASUREMENT (MEASURABLE RANGE IS NARROW)

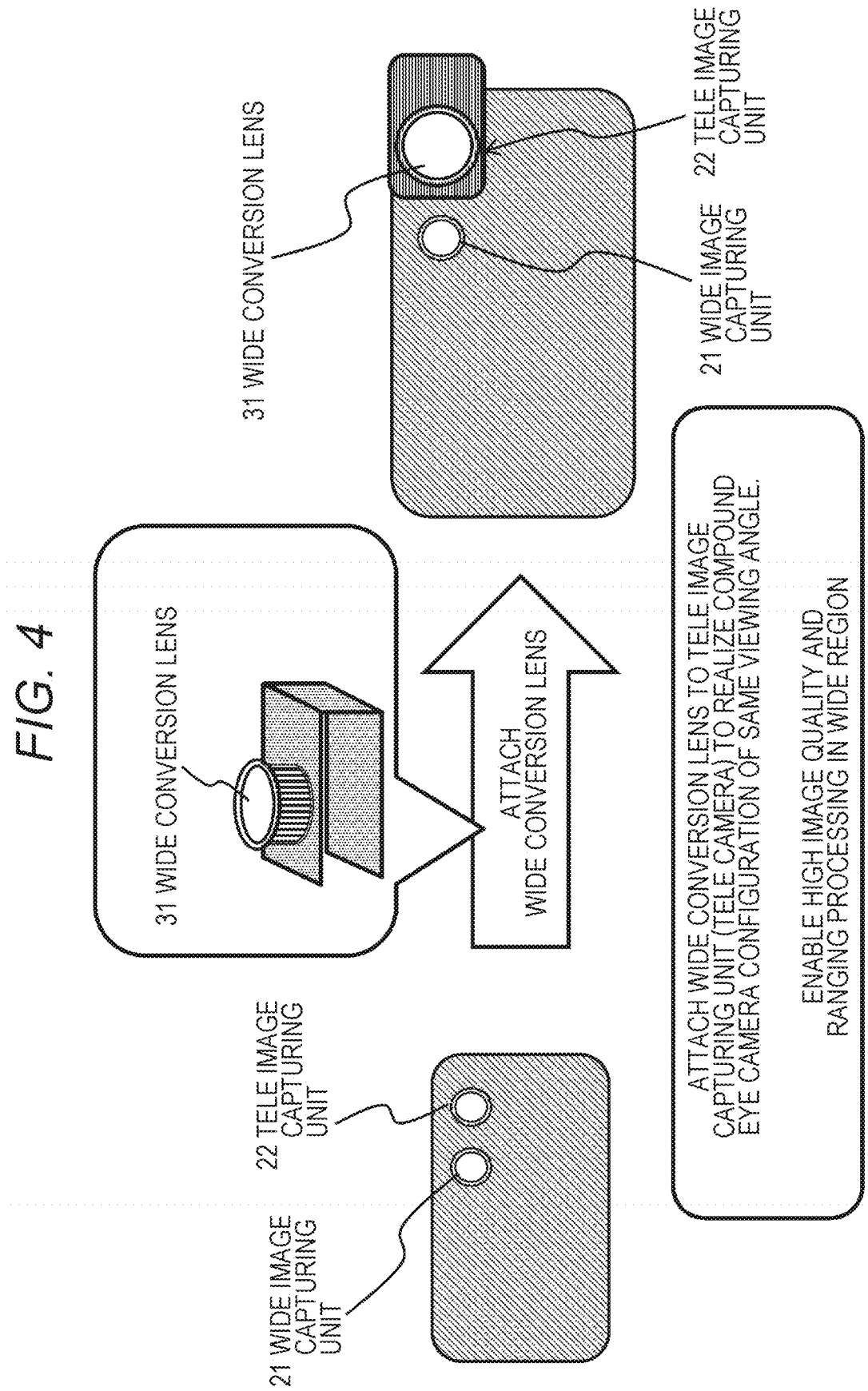

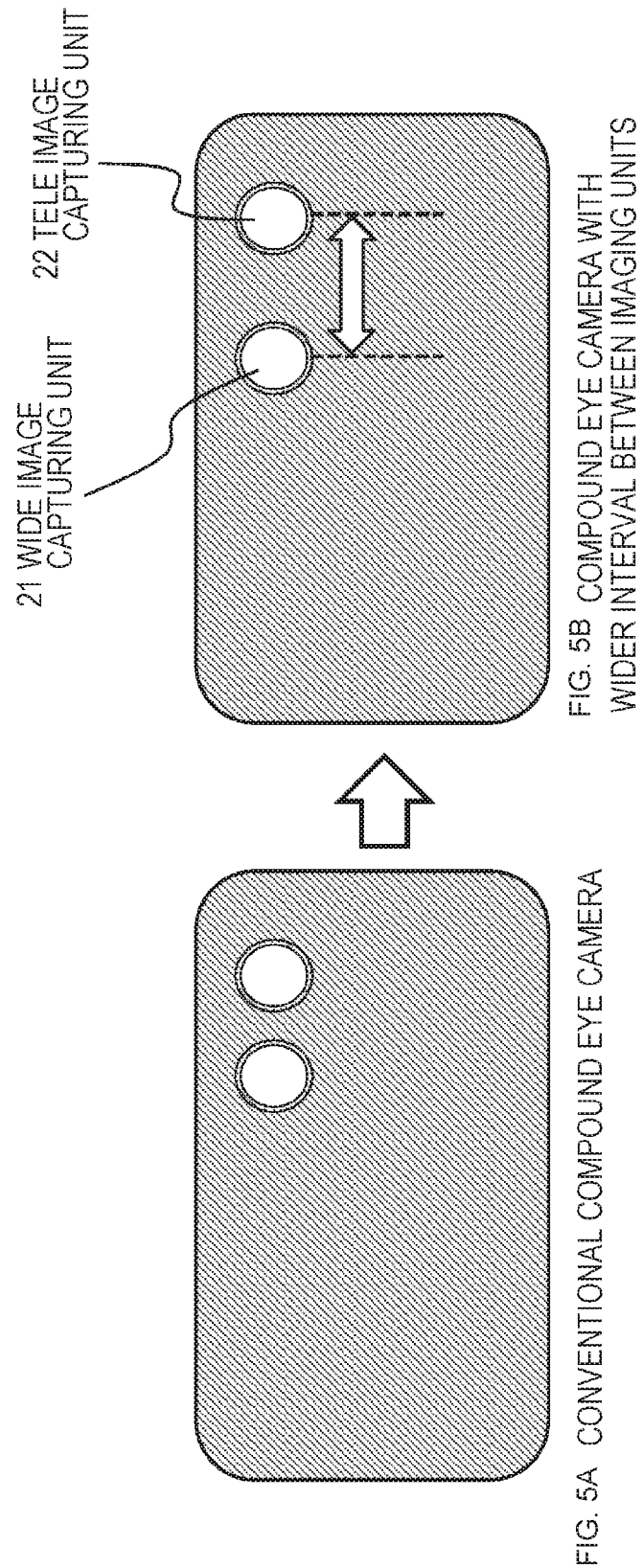

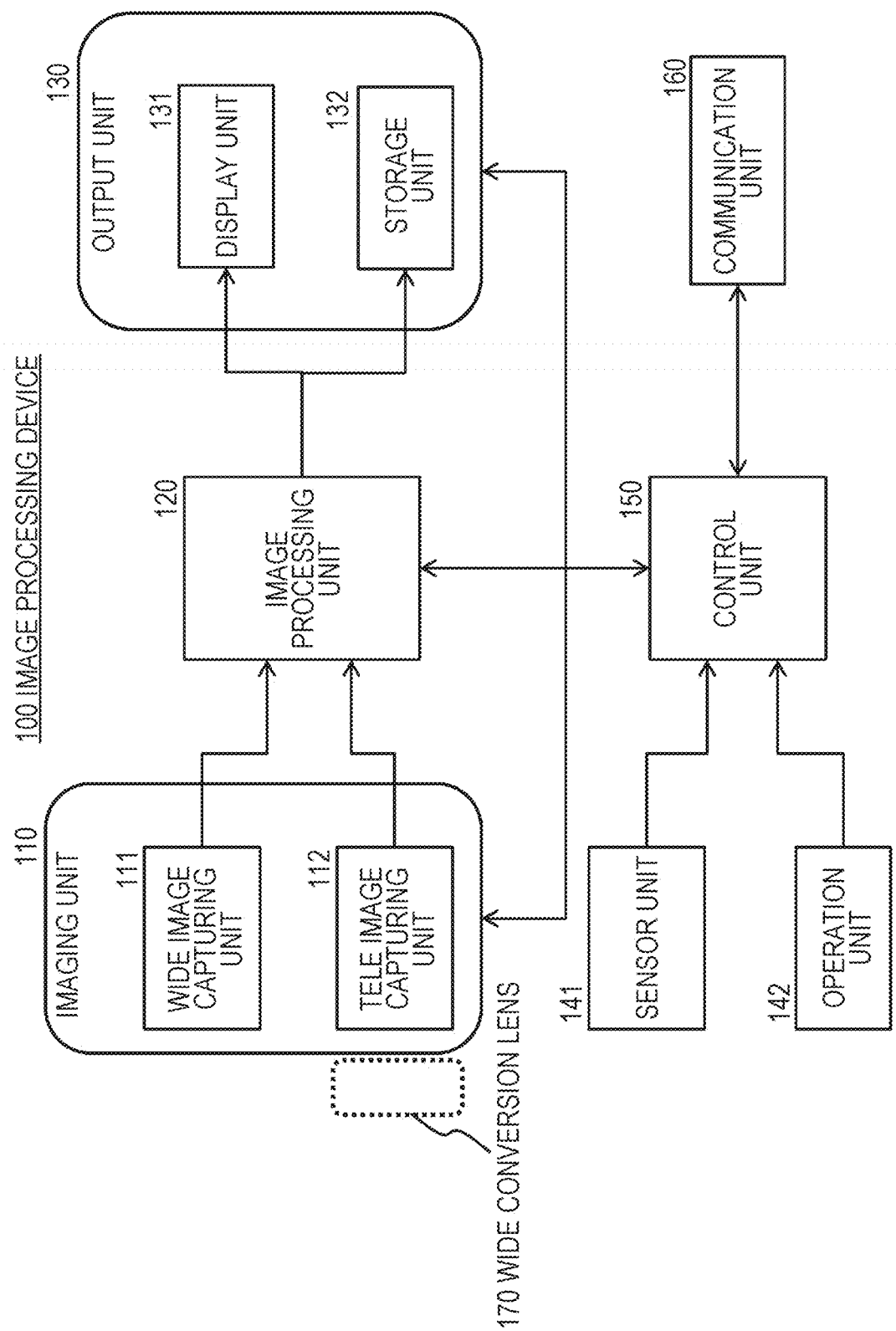

FIG. 10

(1) OPTIMAL MODE AUTOMATIC SELECTION EXAMPLE

| | WIDE CONVERSION LENS ATTACHMENT | OPTICAL ZOOM TRANSITION | | LOW ILLUMINANCE | BACKLIGHT | ZOOM MAGNIFICATION LARGE | MODE |
|---|---|---|---|---|---|---|---|
| (A) | YES | THERE IS NO TRANSITION FROM WIDE IMAGE CAPTURING TO TELE IMAGE CAPTURING | (a1) | yes | yes/no | yes/no | HIGH SENSITIVITY |
| | | | (a2) | no | yes | yes/no | HDR |
| | | | (a3) | no | no | yes | SUPER SENSITIVITY |
| (B) | NO | THERE IS TRANSITION FROM WIDE IMAGE CAPTURING TO TELE IMAGE CAPTURING | | - | - | - | ONLY NORMAL IMAGING |

ONE MODE IS EXCLUSIVELY SET. PRIORITY MAY BE VARIOUSLY SET

HIGH ↕ PRIORITY ↕ LOW (2) MODE MANUAL SELECTION EXAMPLE

| | WIDE CONVERSION LENS ATTACHMENT | OPTICAL ZOOM TRANSITION | UI MENU |
|---|---|---|---|
| (A) | YES | THERE IS NO TRANSITION FROM WIDE IMAGE CAPTURING TO TELE IMAGE CAPTURING | DISPLAY SELECTION UI OF "HIGH-SENSITIVITY MODE", "HDR MODE", AND "SUPER-RESOLUTION MODE" |
| (B) | NO | THERE IS TRANSITION FROM WIDE IMAGE CAPTURING TO TELE IMAGE CAPTURING | NOT DISPLAYED |

FIG. 16

| (1) WIDE CONVERSION LENS ATTACHMENT | (2) DISTANCE (DEPTH) MEASURING RANGE (MEASURABLE VIEWING ANGLE) | (3) CORRECT STANDARD CALIBRATION DATA OR SELECT OPTIMAL CALIBRATION DATA |
|---|---|---|
| (A) YES | IMAGING VIEWING ANGLE OF WIDE IMAGE CAPTURING UNIT | NECESSARY |
| (B) NO | IMAGING VIEWING ANGLE OF TELE IMAGE CAPTURING UNIT | NOT NECESSARY |

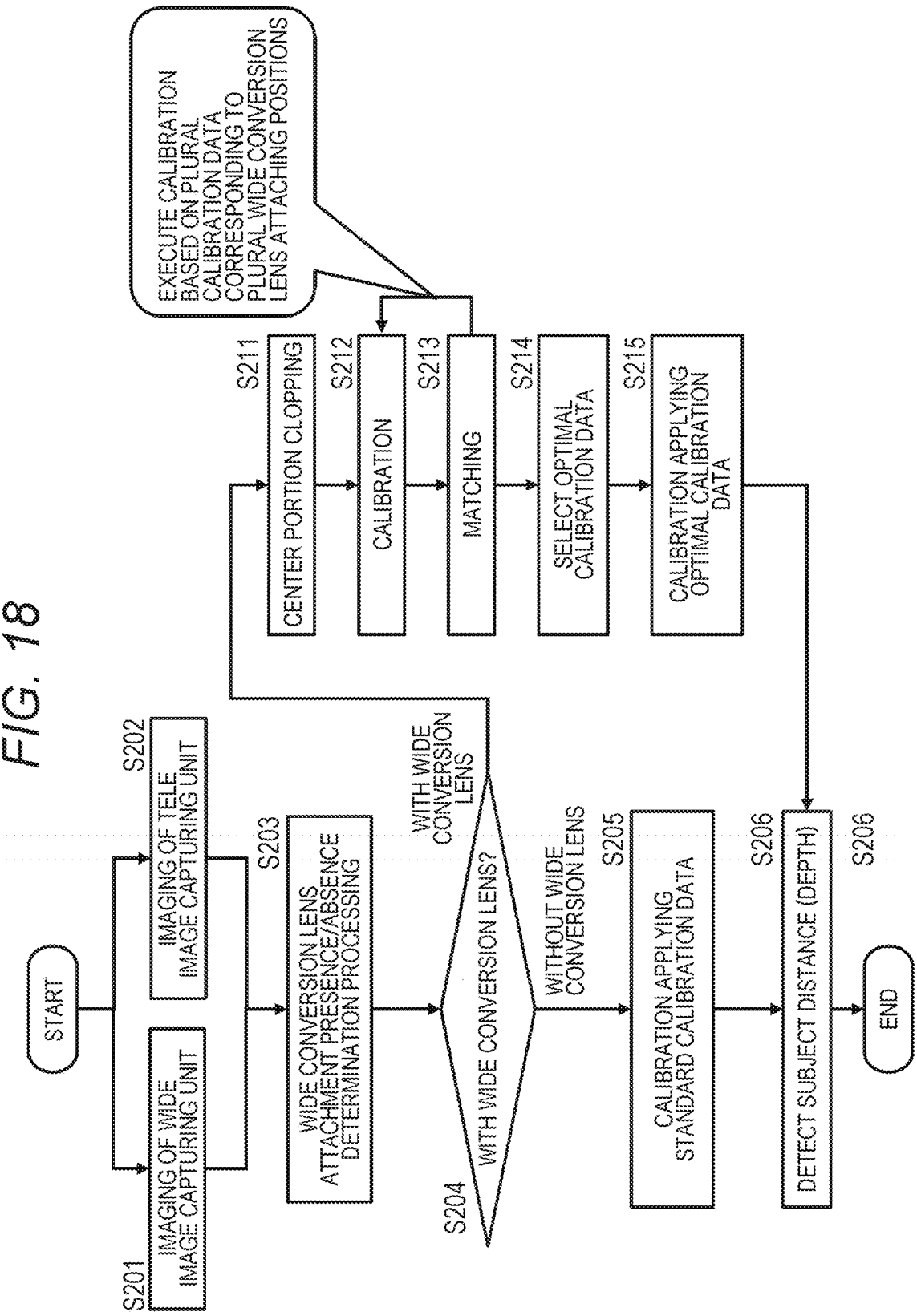

IMAGE PROCESSING DEVICE AND IMAGE PROCESSING METHOD TO GENERATE ONE IMAGE USING IMAGES CAPTURED BY TWO IMAGING UNITS

CROSS REFERENCE TO RELATED APPLICATIONS

This application is a U.S. National Phase of International Patent Application No. PCT/JP2019/017314 filed on Apr. 23, 2019, which claims priority benefit of Japanese Patent Application No. JP 2018-093748 filed in the Japan Patent Office on May 15, 2018. Each of the above-referenced applications is hereby incorporated herein by reference in its entirety.

TECHNICAL FIELD

The present disclosure relates to an image processing device, an image processing method, and a program. More specifically, this relates to an image processing device, an image processing method, and a program which generates one image using two images captured by imaging units in different positions.

BACKGROUND ART

There is a compound eye camera (imaging device) which generates one output image using two images captured by imaging units in different positions. For example, Patent Document 1 (Japanese Unexamined Patent Publication No. 2016-527734) discloses a configuration capable of smoothly switching visual field ranges at the time of zoom processing using two images captured via an imaging unit including two different lenses of wide lens having a wide visual field and tele lens having a tele visual field narrower than the wide visual field.

CITATION LIST

Patent Document

Patent Document 1: Japanese Unexamined Patent Publication No. 2016-527734
Patent Document 2: Japanese Patent Application Laid-Open No. 2010-170340
Patent Document 3: Japanese Patent Application Laid-Open No. 2011-199716

SUMMARY OF THE INVENTION

Problems to be Solved by the Invention

The above-described Patent Document 1 discloses the smooth switching of the visual field range at the time of zoom processing; however, this does not disclose a configuration of improving a quality of an output image and the like by using the captured images of the two imaging units.

An object of the present disclosure is to provide an image processing device, an image processing method, and a program capable of performing processing such as generation of a high-quality image by using captured images of two imaging units of a wide image capturing unit which captures a wide image of a wide visual field range and a tele image capturing unit which captures a tele image of a narrow visual field range.

Solutions to Problems

A first aspect of the present disclosure is
an image processing device including:
a wide image capturing unit that captures an image of a wide viewing angle;
a tele image capturing unit that captures an image of a narrower viewing angle than the viewing angle of the wide image capturing unit; and
an image processing unit that receives an input of captured images of the wide image capturing unit and the tele image capturing unit and executes signal processing,
in which the image processing unit includes
a wide conversion lens attachment detection unit that detects whether or not a wide conversion lens capable of capturing an image of substantially the same viewing angle as the viewing angle of the wide image capturing unit is attached to the tele image capturing unit, and
a signal processing unit that executes different signal processing according to a detection result of the wide conversion lens attachment detection unit.

Moreover, a second aspect of the present disclosure is
an image processing method executed in an image processing device, the method executing:
a step of capturing an image by each of a wide image capturing unit that captures an image of a wide viewing angle and a tele image capturing unit that captures an image of a narrower viewing angle than the viewing angle of the wide image capturing unit; and
an image processing step in which the image processing unit receives an input of captured images of the wide image capturing unit and the tele image capturing unit and executes signal processing,
in which the image processing step executes
wide conversion lens attachment detection processing of detecting whether or not a wide conversion lens capable of capturing an image of substantially the same viewing angle as the viewing angle of the wide image capturing unit is attached to the tele image capturing unit, and
different signal processing according to a result of the wide conversion lens attachment detection.

Moreover, a third aspect of the present disclosure is
a program that allows an image processing device to execute image processing, the program allowing the image processing device to execute:
a step of capturing an image by each of a wide image capturing unit that captures an image of a wide viewing angle and a tele image capturing unit that captures an image of a narrower viewing angle than the viewing angle of the wide image capturing unit; and
an image processing step in which an image processing unit receives an input of captured images of the wide image capturing unit and the tele image capturing unit and executes signal processing,
in which, at the image processing step,
a wide conversion lens attachment detection processing of detecting whether or not a wide conversion lens capable of capturing an image of substantially the same viewing angle as the viewing angle of the wide image capturing unit is attached to the tele image capturing unit, and
different signal processing according to a result of the wide conversion lens attachment detection
are executed.

Note that the program of the present disclosure is, for example, a program which may be provided by a storage medium or a communication medium provided in a computer-readable format to an information processing device or a computer system capable of executing various program codes. By providing such program in the computer-readable format, processing according to the program is realized on the information processing device and the computer system.

Still another object, feature, and advantage of the present disclosure will become clear by further detailed description with reference to an embodiment to be described later and the attached drawings of the present disclosure. Note that, in the present specification, the system is a logical set configuration of a plurality of devices, and is not limited to that in which each configuration device is in the same casing.

Effects of the Invention

According to a configuration of one embodiment of the present disclosure, a device and a method capable of generating a high-quality image similar to that of a same viewing angle compound eye camera are realized by using captured images of a tele/wide compound eye camera.

Specifically, a wide image capturing unit which captures an image of a wide viewing angle, a tele image capturing unit which captures an image of a narrow viewing angle, and an image processing unit which receives an input of captured images of the respective imaging units and executes signal processing are included, for example. In a case where a wide conversion lens is attached to the tele image capturing unit, the image processing unit executes any one of high-sensitivity image generation processing, HDR image generation processing, or high-resolution image generation processing based on the captured images of the wide image capturing unit and the tele image capturing unit according to a situation at the time of imaging with a wide conversion lens attachment detection unit which detects whether or not the wide conversion lens is attached.

According to this configuration, a device and a method capable of generating a high-quality image similar to that of the same viewing angle compound eye camera are realized by using the captured images of the tele/wide compound eye camera.

Note that, the effect described in this specification is illustrative only and is not limitative; there may also be an additional effect.

BRIEF DESCRIPTION OF DRAWINGS

FIGS. 1A and 1B are views for illustrating an external configuration example of an image processing device.

FIGS. 2A and 2B are views for illustrating an example of captured images of a wide image capturing unit and a tele image capturing unit.

FIGS. 3A and 3B are views for illustrating a viewing angle and an imaging range of a tele/wide compound eye camera and a same viewing angle compound eye camera.

FIG. 4 is a view for illustrating an attachable/detachable wide conversion lens.

FIGS. 5A and 5B are views for illustrating an example of arrangement of the wide image capturing unit and the tele image capturing unit.

FIG. 6 is a view for illustrating a configuration example of the image processing device.

FIG. 10 is a view for illustrating optimal mode automatic selection processing.

FIG. 16 is a view for illustrating a processing aspect in subject distance calculation processing according to whether or not the wide conversion lens is attached.

FIG. 18 is a view illustrating a flowchart for illustrating a sequence of subject distance calculation processing executed by the image processing device.

MODE FOR CARRYING OUT THE INVENTION

Figure 7:
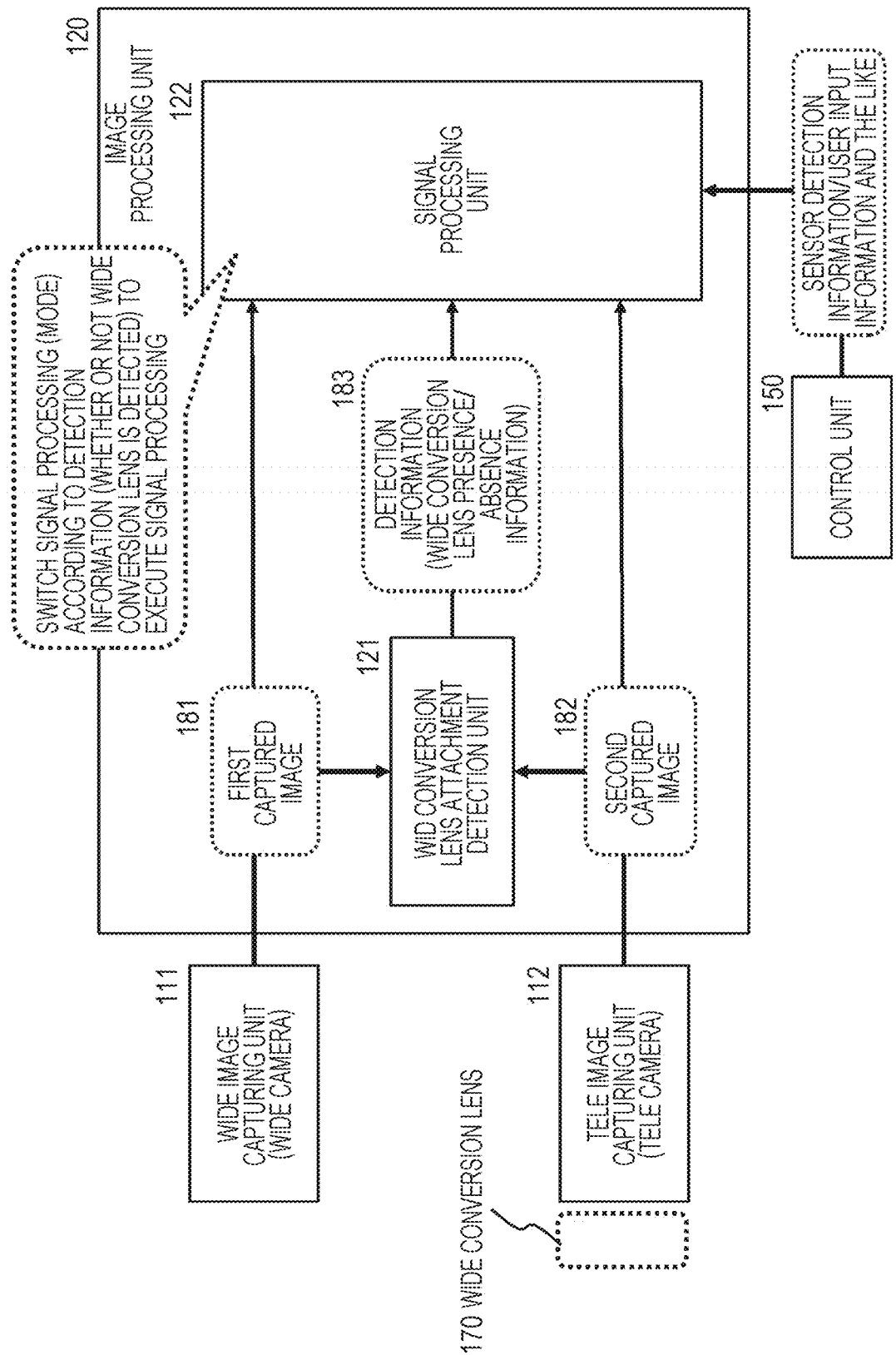
FIG. 7 is a view for illustrating a configuration example of an image processing unit.

Hereinafter, details of an image processing device, an image processing method, and a program of the present disclosure are described with reference to the drawings. Note that the description is given according to the following items.

1. Regarding configuration example of image processing device
2. Regarding overall configuration and processing of image processing device of present disclosure
3. Regarding configuration and processing of image processing unit
4. Regarding processing executed by wide conversion lens attachment detection unit
5. Regarding processing executed by signal processing unit
6. Regarding sequence of processing executed by image processing device
7. Regarding embodiment of executing measurement processing of subject distance
8. Summary of configuration of present disclosure

[1. Regarding Configuration Example of Image Processing Device]

FIGS. 1A and 1B are views illustrating a configuration example of an image processing device of the present disclosure. FIGS. 1A and 1B illustrate an information processing terminal (smartphone) having a camera function, which is an example of the image processing device of the present disclosure.

Note that the image processing device of the present disclosure is not limited to such information processing terminal (smartphone), and includes, for example, an imaging device such as a camera or a device such as a PC which receives an input of an image captured by a camera and performs image processing.

FIG. 1A illustrates a front side of an image processing device 10; a display unit 11 and an operation unit 12 are provided on the front side. FIG. 1B illustrates a rear side of the image processing device 10 on which a plurality of imaging units is provided: that is, a wide image capturing unit (wide camera) 21 capable of capturing an image of a wide visual field range, and a tele image capturing unit (tele camera) 22 capable of capturing an image of a visual field range narrower than that of the wide image capturing unit 21, for example, a telephoto image.

FIGS. 2A and 2B are views illustrating an example of captured images of the wide image capturing unit 21 and the tele image capturing unit 22. An image illustrated in FIG. 2A is an example of an image (wide image) captured by the wide image capturing unit 21, and FIG. 2B is an example of an image (tele image) captured by the tele image capturing unit 22.

The wide image captured by the wide image capturing unit 21 illustrated in FIG. 2A is a wide angle captured image, a wide angle image of a wide viewing angle, that is, an image having a wide visual field. In contrast, the tele image captured by the tele image capturing unit 22 illustrated in FIG. 2B is a telephoto captured image, an image of a narrow viewing angle, that is, an image having a narrow visual field.

FIG. 3A illustrates processing which may be executed using imaging ranges (viewing angles) of a camera including two imaging units of the wide image capturing unit (wide camera) 21 and the tele image capturing unit (tele camera) 22, that is a tele/wide compound eye camera, and captured images of the tele/wide compound eye camera.

In contrast, FIG. 3B illustrates processing which may be executed using imaging ranges (viewing angles) of a same viewing angle compound eye camera having the same imaging range (viewing angle) and captured images of the same viewing angle compound eye camera.

As illustrated in FIG. 3A, the processing which may be executed using the captured images of the tele/wide compound eye camera includes (A1) zoom processing, and (A2) depth (subject distance) measurement.

(A1) The zoom processing is intended to mean that it is possible to capture a smoothly transitioning zoom image by switching between the wide image and the tele image along with the zoom processing.

(A2) The depth (subject distance) measurement is intended to mean that it is possible to calculate the subject distance using the captured images from different viewpoints of the wide image capturing unit 21 and the tele image capturing unit 22. However, a region in which the subject distance may be calculated is limited to an overlapping captured image region by the two imaging units, and as a result, only the subject distance of a narrow region which may be imaged by the tele image capturing unit 22 may be measured.

In contrast, as illustrated in FIG. 3B, processing which may be executed using the captured images of the same viewing angle compound eye camera includes (B1) high-resolution image generation, (B2) high-sensitivity image generation, (B3) high dynamic range (HDR) image generation, and (B4) depth (subject distance) measurement.

(B1) The high-resolution image generation is, for example, processing of generating a higher-resolution image than captured images using pixel information of a plurality of time-series continuous captured images captured by two cameras. For example, a high-resolution image may be generated by performing processing disclosed in Patent Document 2 (Japanese Patent Application Laid-Open No. 2010-170340).

(B2) The high-sensitivity image generation is processing of generating a higher-sensitivity image than captured images using pixel information of a plurality of time-series continuous captured images captured by two cameras, as is the case with the high-resolution image generation. For example, a high-sensitivity image may be generated by performing processing disclosed in Patent Document 3 (Japanese Patent Application Laid-Open No. 2011-199716).

(B3) The high dynamic range (HDR) image generation is processing of generating an image having wider range of pixel values from low luminance to high luminance, that is, a high dynamic range image by capturing a short exposure image and a long exposure image while shifting an exposure time of each camera and using a pixel value of the short exposure image for a high-luminance portion and using a pixel value of the long exposure image for a low-luminance portion.

(B4) The depth (subject distance) measurement is to calculate the subject distance using the captured images from different viewpoints by two cameras. A region in which the subject distance may be calculated is an overlapping captured image region by the two imaging units. As illustrated in FIG. 3B, the captured images of the same viewing angle compound eye camera have the same imaging region, and it is possible to calculate the distances of subjects in an entire imaging region.

As illustrated in FIGS. 3A and 3B, there is a problem that the number of processing which may be executed using the captured images of the tele/wide compound eye camera is smaller than that which may be executed using the captured images of the same viewing angle compound eye camera.

[2. Regarding Overall Configuration and Processing of Image Processing Device of Present Disclosure]

As described above, the compound eye camera having the configuration illustrated in FIGS. 1A and 1B, that is, the compound eye camera including the wide image capturing unit (wide camera) 21 capable of capturing an image of a wide visual field range, and the tele image capturing unit (tele camera) 22 capable of capturing an image of a narrower visual field range than the wide image capturing unit 21, for example, a telephoto image has a problem that the number of processing which may be executed is smaller than that of the same viewing angle compound eye camera.

An overall configuration and processing of the image processing device of the present disclosure which solves this problem is hereinafter described.

As illustrated in FIG. 4, the image processing device of the present disclosure uses a wide conversion lens 31 which may be attached to and detached from the image processing device 10.

By attaching the wide conversion lens 31 onto a lens of the tele image capturing unit (tele camera) 22, the captured image of the tele image capturing unit (tele camera) 22 may be made an image of substantially the same viewing angle as that of the wide image capturing unit (wide camera) 21.

The wide conversion lens 31 has an attachable/detachable configuration easily attached to and detached from the tele image capturing unit 22 by a user.

In a state in which the wide conversion lens 31 is not attached, it is possible to capture an image with smooth zoom processing as the tele/wide compound eye camera.

Furthermore, in a state in which the wide conversion lens 31 is attached, it is possible to execute each processing described with reference to FIG. 3B as the same viewing angle compound eye camera.

Note that the wide conversion lens 31 is configured to be attachable to and detachable from the tele image capturing unit 22, and when the wide image capturing unit 21 and the tele image capturing unit 22 are arranged close to each other, the wide conversion lens 31 attached to the tele image capturing unit 22 might obstruct the visual field of the wide image capturing unit 21.

In order to avoid such a problem, it is preferable to arrange the wide image capturing unit 21 and the tele image capturing unit 22 with a large distance therebetween as illustrated in FIGS. 5A and 5B.

The image processing device 10 of the present disclosure detects whether or not the wide conversion lens 31 is attached to the tele image capturing unit 22, and a signal processing unit of the image processing device 10 executes different types of signal processing depending on detection information. Specifically, generation of a high-resolution image (super-resolution image), generation of a high dynamic range (HDR) image, generation of a high-sensitivity image and the like are executed. A specific example of the configuration and processing of the image processing device of the present disclosure is hereinafter described.

FIG. 6 is a view illustrating an overall configuration of an image processing device 100 of the present disclosure. Note that the image processing device 10 illustrated in FIGS. 1A and 1B are examples of the image processing device 100 illustrated in FIG. 6.

As illustrated in FIG. 6, the image processing device 100 includes two imaging units of a wide image capturing unit 111 and a tele image capturing unit 112 as an imaging unit 110. Moreover, this includes an image processing unit 120 and an output unit 130. The output unit 130 includes a display unit 131 and a storage unit 132. Moreover, this includes a sensor unit 141, an operation unit 142, a control unit 150, and a communication unit 160.

Moreover, this has a configuration capable of attaching/detaching a wide conversion lens 170 to/from the tele image capturing unit 112.

The wide image capturing unit 111 and the tele image capturing unit 112 are provided on the same surface side of the image processing device 100 as described with reference to FIG. 1B, for example. The wide image capturing unit 111 and the tele image capturing unit 112 are configured using an imaging element such as a complementary metal oxide semiconductor (CMOS) image sensor, perform photoelectric conversion of light captured by a lens, and generate image data of a captured image to output to the image processing unit 120.

Note that the wide image capturing unit 111 and the tele image capturing unit 112 have a configuration of capturing images of different visual field ranges of the captured images, that is, images of different viewing angles as described above with reference to FIG. 3A.

The image processing unit 120 receives an input of the captured images obtained by the wide image capturing unit 111 and the tele image capturing unit 112 and generates an output image using these images. Note that the image processing unit 120 receives the input of the captured images obtained by the wide image capturing unit 111 and the tele image capturing unit 112 and first determines whether or not the wide conversion lens 170 is attached to the tele image capturing unit 112.

The image processing unit 120 receives an input of this determination result and other information, for example, user setting information, illuminance information, backlight presence/absence information, zoom setting information and the like, determines signal processing to be executed on the basis of the input information, and executes the determined signal processing to generate the output image.

A specific configuration of the image processing unit 120 and details of the processing to be executed are described later with reference to FIG. 7 and subsequent drawings.

The sensor unit 141 includes an illuminance sensor, a backlight detection sensor, a zoom setting detection sensor, a gyro sensor and the like, and obtains illuminance information, backlight presence/absence information, zoom setting information, shake and angle information and the like. The obtained information is input to the control unit 150. The image processing unit 1220 obtains the sensor detection information via the control unit 150.

The communication unit 160 communicates with devices on a network such as a local area network (LAN) and the Internet.

The display unit 131 displays a captured image on the basis of the image data supplied from the image processing unit 120 and displays a menu screen, various application screens and the like on the basis of an information signal from the control unit 150. Note that a display surface of the display unit 131 has a touch panel configuration and is configured such that a GUI function may be used.

The operation unit 142 formed using an operation switch and the like generates an operation signal corresponding to a user operation and outputs the same to the control unit 150.

The storage unit 132 stores information generated by the image processing device 100, for example, the image data supplied from the image processing unit 120, various pieces of information used for communicating and executing applications by the image processing device 100, and further, programs, parameters and the like of the processing executed by the image processing device 100.

The control unit 150 includes a central processing unit (CPU), a read only memory (ROM), a random access memory (RAM) (not illustrated) and the like. The control unit 150 executes the program stored in the storage unit 132 or a memory such as a ROM, a RAM or the like not illustrated to control the processing executed by the image processing device 100.

Furthermore, this controls an operation of each unit such that the image processing device 100 performs an operation according to the user operation on the touch panel which forms the display unit 131 and the operation unit 142.

Note that the image processing device 100 is not limited to the configuration illustrated in FIG. 6, and for example, an encoding processing unit for encoding the image data to store in the storage unit 132, a resolution conversion unit which adjusts resolution of the image data to that of the display unit and the like may also be provided.

[3. Regarding Configuration and Processing of Image Processing Unit]

Next, a configuration and processing of the image processing unit 120 are described.

FIG. 7 is a view illustrating a configuration example of the image processing unit 120. As illustrated in FIG. 7, the image processing unit 120 includes a wide conversion lens attachment detection unit 121 and a signal processing unit 122.

The wide conversion lens attachment detection unit 121 receives an input of a first captured image 181 captured by the wide image capturing unit 111 and a second captured image 182 captured by the tele image capturing unit 112 and determines whether or not the wide conversion lens 170 is attached to the tele image capturing unit 112 by image analysis using these two images. The wide conversion lens attachment detection unit 121 outputs detection information 183 including wide conversion lens presence/absence information as a determination result to the signal processing unit 122.

Note that the first captured image 181 and the second captured image 182 are the images captured at the same timing.

The signal processing unit 122 determines a signal processing aspect for generating the output image on the basis of the detection information 183 including the wide conversion lens presence/absence information input from the wide conversion lens attachment detection unit 121, the sensor detection information input via the control unit 150, user input information and the like, and executes the determined signal processing to generate the output image. Specifically, generation of a high-resolution image (super-resolution image), generation of a high dynamic range (HDR) image, generation of a high-sensitivity image and the like are executed.

Note that, the sensor detection information input via the control unit 150 includes, for example, the illuminance information, backlight presence/absence information, zoom setting information and the like.

[4. Regarding Processing Executed by Wide Conversion Lens Attachment Detection Unit]

Next, a specific example of wide conversion lens attachment presence/absence determination processing executed by the wide conversion lens attachment detection unit 121, that is, processing of determining whether or not the wide conversion lens 170 is attached to the tele image capturing unit 112 is described.

This determination processing is performed by comparison processing between the first captured image 181 captured by the wide image capturing unit 111 and the second captured image 182 captured by the tele image capturing unit 112.

The determination processing may be performed by applying any of following processing, for example.

(1) Determination processing based on histogram similarity between the first captured image 181 and the second captured image 182, and (2) determination processing based on a sum of absolute differences (SAD) and a disparity amount between the first captured image 181 and the second captured image 182;

hereinafter, these processing examples are sequentially described.

Figure 8:
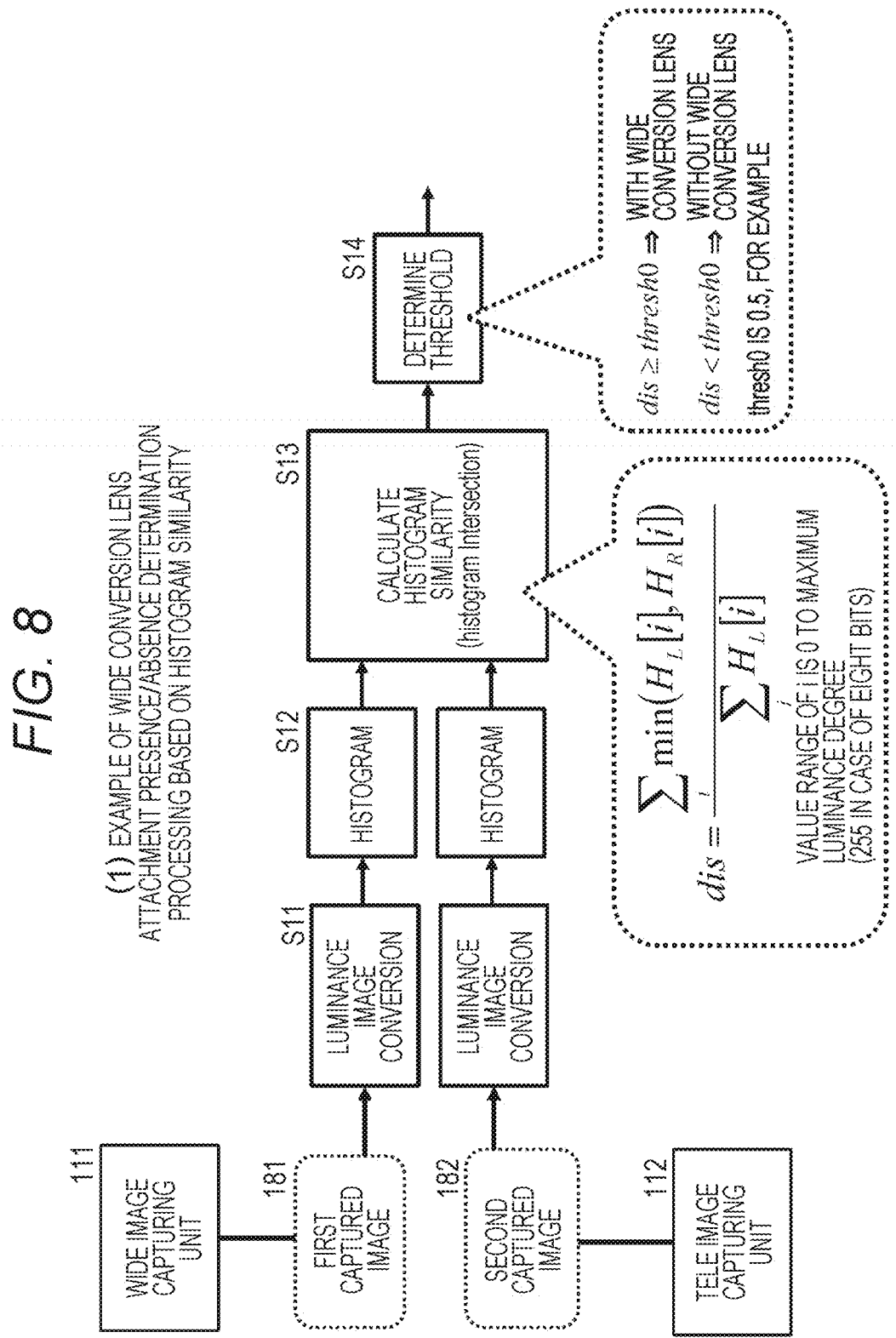
FIG. 8 is a view for illustrating wide conversion lens attachment presence/absence determination processing based on histogram similarity.

First, with reference to FIG. 8, (1) an example of the determination processing based on the histogram similarity between the first captured image 181 and the second captured image 182 is described.

The wide conversion lens attachment presence/absence determination processing based on the histogram similarity is performed according to processes at steps S11 to S14 illustrated in FIG. 8. The process at each step is described below.

(Step S11)

First, at step S11, each of the first captured image 181 captured by the wide image capturing unit 111 and the second captured image 182 captured by the tele image capturing unit 112 is converted into a luminance image.

(Step S12)

Next, at step S12, a histogram being luminance distribution data of each of the luminance image of the first captured image 181 captured by the wide image capturing unit 111 and the luminance image of the second captured image 182 captured by the tele image capturing unit 112 is generated.

(Step S13)

Next, at step S13, similarity between the histogram indicating the luminance distribution of the first captured image 181 captured by the wide image capturing unit 111 and the histogram indicating the luminance distribution of the second captured image 182 captured by the tele image capturing unit 112, that is, the histogram similarity (histogram intersection) is calculated.

The histogram similarity (dis) may be calculated, for example, according to following (expression 1).

[Mathematical expression 1]

$$dis = \frac{\sum_i \min(H_L[i], H_R[i])}{\sum_i H_L[i]}$$ (EXPRESSION 1)

Note that in (expression 1) described above, $H_L[i]$: a degree of luminance i of the first captured image 181 captured by the wide image capturing unit 111, $H_R[i]$: a degree of luminance i of the second captured image 182 captured by the tele image capturing unit 112, in which i is 0 to maximum luminance degree (255 in a case of eight bits).

(Step S14)

Finally, a predetermined threshold (thresh0) is compared with the histogram similarity (dis) calculated at step S13.

dis≥thresh0

In a case where the above-described determination expression is established, it is determined that the wide conversion lens 170 is attached to the tele image capturing unit 112.

In contrast, dis<thresh0 in a case where the above-described determination expression is established, it is determined that the wide conversion lens 170 is not attached to the tele image capturing unit 112.

Note that the threshold (thresh0) is the predetermined threshold such as 0.5, for example.

Figure 9:
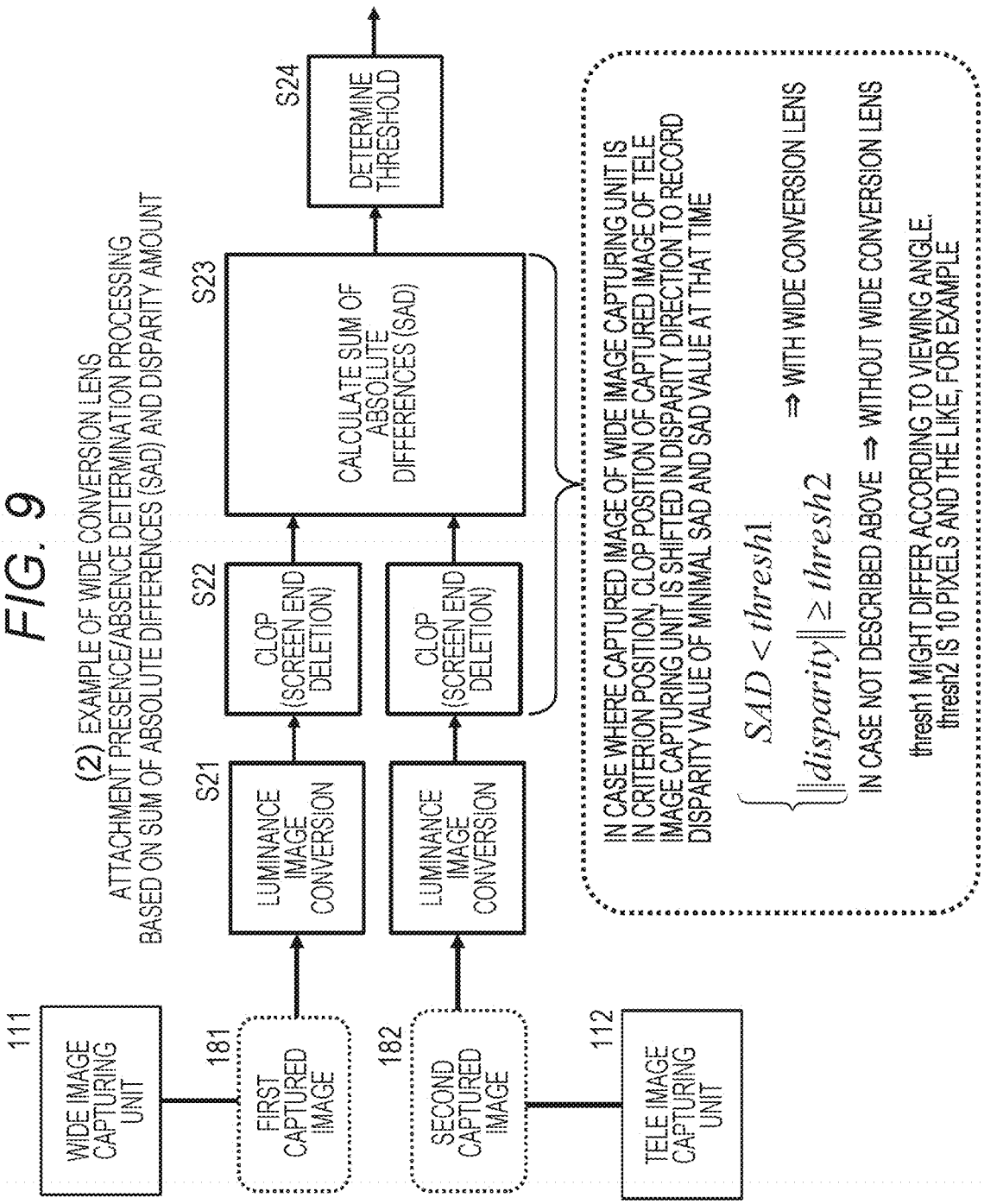
FIG. 9 is a view for illustrating wide conversion lens attachment presence/absence determination processing based on a SAD and a disparity amount.

Next, with reference to FIG. 9, an example of (2) the determination processing on the basis of the sum of absolute differences (SAD) and the disparity amount between the first captured image 181 and the second captured image 182 is described.

The wide conversion lens attachment presence/absence determination processing based on the sum of absolute differences (SAD) and the disparity amount is performed according to processes at steps S21 to S24 illustrated in FIG. 9. The process at each step is described below.

(Step S21)

First, at step S21, each of the first captured image 181 captured by the wide image capturing unit 111 and the second captured image 182 captured by the tele image capturing unit 112 is converted into the luminance image.

(Step S22)

Next, at step S22, clop processing of each of the luminance image of the first captured image 181 captured by the wide image capturing unit 111 and the luminance image of the second captured image 182 captured by the tele image capturing unit 112 is performed. Specifically, deletion processing of an end of the image is performed. An object of this processing is to eliminate a noisy end region.

(Step S23)

Next, at step S23, the sum of absolute differences (SAD) and the disparity amount (disparity) between the luminance image of the first captured image 181 captured by the wide image capturing unit 111 from which the end region is eliminated and the luminance image of the second captured image 182 captured by the tele image capturing unit 112 from which the end region is eliminated are calculated.

(Step S24)

Finally, predetermined thresholds (thresh 1 and 2) are compared with the sum of absolute differences (SAD) and the disparity amount (disparity) calculated at step S23.

$$SAD < thresh1, \text{ and}$$

$$\|disparity\| \geq thresh2$$

in a case where the above-described determination expressions are established, it is determined that the wide conversion lens 170 is attached to the tele image capturing unit 112.

In contrast, in a case where the above-described determination expressions are not established, it is determined that the wide conversion lens 170 is not attached to the tele image capturing unit 112.

Note that the thresholds (thresh 1 and 2) are the predetermined thresholds determined according to a camera configuration.

In this manner, the wide conversion lens attachment detection unit 121 determines whether or not the wide conversion lens 170 is attached to the tele image capturing unit 112 by performing any of (1) the determination processing based on the histogram similarity between the first captured image 181 and the second captured image 182 described with reference to FIG. 8, or (2) the determination processing based on the sum of absolute differences (SAD) and the disparity amount between the first captured image 181 and the second captured image 182 described with reference to FIG. 9, for example.

That is, the wide conversion lens attachment detection unit 121 determines whether or not the wide conversion lens 170 is attached to the tele image capturing unit 112 using the first captured image 181 captured by the wide image capturing unit 111 and the second captured image 182 captured by the tele image capturing unit 112.

[5. Regarding Processing Executed by Signal Processing Unit]

Next, the processing executed by the signal processing unit 122 in the image processing unit 120 illustrated in FIG. 7 is described in detail.

As described above with reference to FIG. 7, the signal processing unit 122 receives the input of the detection information 183 including the wide conversion lens presence/absence information from the wide conversion lens attachment detection unit 121. The signal processing unit 122 further receives the input of the sensor detection information and the user input information via the control unit 150. The signal processing unit 122 determines the signal processing aspect for generating the output image on the basis of the information, and executes the determined signal processing to generate the output image. Specifically, generation of a high-resolution image (super-resolution image), generation of a high dynamic range (HDR) image, generation of a high-sensitivity image and the like are executed. Note that, the sensor detection information input via the control unit 150 includes, for example, the illuminance information, backlight presence/absence information, zoom setting information and the like.

In a case of receiving the input of the detection information 183 indicating that the wide conversion lens is attached from the wide conversion lens attachment detection unit 121, the signal processing unit 122 executes any one of following three modes:

(mode 1) high-sensitivity image generation mode,
(mode 2) HDR image generation mode, and
(mode 3) high-resolution (super-resolution) image generation mode.

There are two settings of "optimal mode automatic selection setting" and "mode manual selection setting" as mode selection aspects for determining the mode out of the three modes on the basis of which the processing is to be executed. The user may determine the setting in advance by inputting. The setting information is stored in, for example, the storage unit 132, and the signal processing unit 122 obtains the setting information via the control unit 150 and performs the processing according to the setting.

In a case where the mode selection setting is "optimal mode automatic selection setting", the signal processing unit 122 automatically selects the optimal mode from the above-described modes 1 to 3 according to imaging state information (illuminance, backlight, zoom setting and the like) at the time of image capturing, and executes the processing of the selected mode.

Furthermore, in a case where the mode selection setting is "mode manual selection setting", the processing of the mode input by the user via the operation unit 142 such as the UI, that is, the mode selected by the user from the above-described modes 1 to 3 is executed.

The processing executed by the signal processing unit 122 in a case where the mode selection setting is "optimal mode automatic selection setting" is described with reference to FIG. 10.

A table illustrated in FIG. 10 is a table illustrating output image generation processing executed by the signal processing unit 122 in two cases:

(A) a case where the wide conversion lens 170 is attached, and (B) a case where the wide conversion lens 170 is not attached to the tele image capturing unit 112.

(A) In a case where the wide conversion lens 170 is attached, the captured image of the wide image capturing unit 111 and the captured image of the tele image capturing unit 112 are the images of the same viewing angle having substantially the same visual fields.

Therefore, optical zoom transition is not performed. That is, processing of transitioning the output image from the captured image of the wide image capturing unit 111 to the captured image of the tele image capturing unit 112 in accordance with the zoom processing or processing opposite to the same is not executed.

In contrast, (B) in a case where the wide conversion lens 170 is not attached, the captured image of the wide image capturing unit 111 and the captured image of the tele image capturing unit 112 are the images of different viewing angles having the different visual fields.

In this case, the optical zoom transition is executed. That is, the processing of transitioning the output image from the captured image of the wide image capturing unit 111 to the captured image of the tele image capturing unit 112 in accordance with the zoom processing or the processing opposite to the same is not executed.

Furthermore, (B) in a case where the wide conversion lens 170 is not attached, the signal processing unit 122 does not generate a high-sensitivity image, a HDR image, and a super-resolution image, but performs image processing for normal captured image, specifically, performs image processing by selecting the captured image of the wide image capturing unit 111 or the captured image of the tele image capturing unit 112 according to a zooming operation and generates one output image to output.

In contrast, (A) in a case where the wide conversion lens 170 is attached, and in a case where the mode selection setting is "optimal mode automatic selection setting", the signal processing unit 122 automatically selects the optimal mode from the following three modes, that is:

(mode 1) high-sensitivity image generation mode,
(mode 2) HDR image generation mode, and
(mode 3) high-resolution (super-resolution) image generation mode according to the imaging state information (illuminance, backlight, zoom setting and the like) at the time of image capturing input via the control unit 150 and executes the signal processing according to the selected mode.

As illustrated in FIG. 10, the signal processing unit 122 performs following mode automatic selection according to the state at the time of image capturing.

(a1) In a case of low illuminance, the signal processing according to the high-sensitivity image generation mode is executed using the captured image of the wide image capturing unit 111 and the captured image of the tele image capturing unit 112 to which the wide conversion lens 170 is attached to generate the high-sensitivity image to output.

Note that it is determined whether or not the illuminance is low on the basis of a comparison with a predetermined threshold, for example.

(a2) In a case where the illuminance is not low and there is backlight, the signal processing according to the HDR image generation mode is executed using the captured image of the wide image capturing unit 111 and the captured image of the tele image capturing unit 112 to which the wide conversion lens 170 is attached to generate the HDR image to output.

Note that it is determined whether or not there is backlight on the basis of a comparison between intensity of observed backlight and a predetermined threshold, for example.

(a3) In a case where the illuminance is not low, there is no backlight, and zoom magnification setting is equal to or larger than a predetermined threshold (for example, 1.0), the signal processing according to the super-resolution image generation mode is executed using the captured image of the wide image capturing unit 111 and the captured image of the tele image capturing unit 112 to which the wide conversion lens 170 is attached to generate the super-resolution image to output.

Note that this example of mode automatic selection is an example, and it may also be configured to perform another mode selection.

Furthermore, in the example illustrated in FIG. 10, the illuminance, the presence/absence of backlight, and the zoom magnification setting are used as the imaging state information used for mode selection; these pieces of information as information applied to the mode selection processing are the illuminance, the presence/absence of backlight, and the zoom magnification setting in descending order of priority. However, this priority setting is also an example, and another priority setting may also be used.

Figure 11:
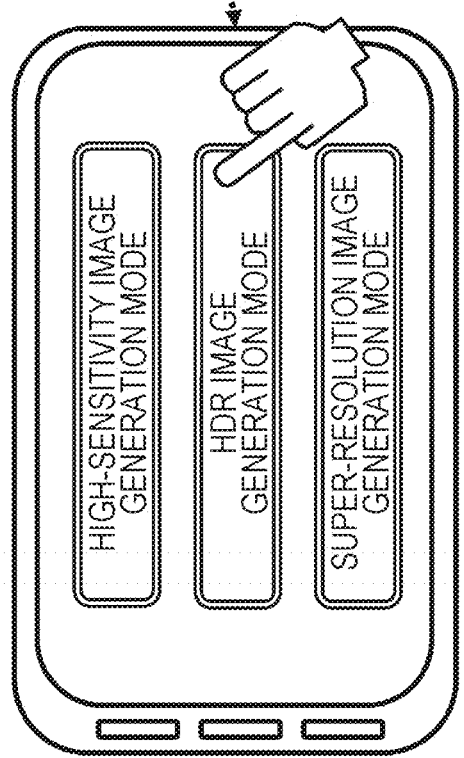
FIG. 11 is a view for illustrating mode manual selection processing.

Next, with reference to FIG. 11, the processing executed by the signal processing unit 122 in a case where the mode selection setting is "mode manual selection setting" is described.

A table illustrated in FIG. 11 is a table illustrating output image generation processing executed by the signal processing unit 122 in two cases:

(A) a case where the wide conversion lens 170 is attached, and
(B) a case where the wide conversion lens 170 is not attached
to the tele image capturing unit 112.

(A) In a case where the wide conversion lens 170 is attached, the captured image of the wide image capturing unit 111 and the captured image of the tele image capturing unit 112 are the images of the same viewing angle having substantially the same visual fields.

Therefore, optical zoom transition is not performed. That is, processing of transitioning the output image from the captured image of the wide image capturing unit 111 to the captured image of the tele image capturing unit 112 in accordance with the zoom processing or processing opposite to the same is not executed.

In contrast, (B) in a case where the wide conversion lens 170 is not attached, the captured image of the wide image capturing unit 111 and the captured image of the tele image capturing unit 112 are the images of different viewing angles having the different visual fields.

In this case, the optical zoom transition is executed. That is, the processing of transitioning the output image from the captured image of the wide image capturing unit 111 to the captured image of the tele image capturing unit 112 in accordance with the zoom processing or the processing opposite to the same is not executed.

Furthermore, (B) in a case where the wide conversion lens 170 is not attached, the signal processing unit 122 does not generate a high-sensitivity image, a HDR image, and a super-resolution image, but performs image processing for normal captured image, specifically, performs image processing by selecting the captured image of the wide image capturing unit 111 or the captured image of the tele image capturing unit 112 according to a zooming operation and generates one output image to output.

In contrast, (A) in a case where the wide conversion lens 170 is attached and the mode selection setting is "mode manual selection setting", the signal processing unit 122 executes the processing according to the mode selected by the user via the operation unit 142 such as the UI.

FIG. 11 illustrates an example of the UI for mode selection by the user. As illustrated in this UI, the user may freely select the mode from the following three modes:

(mode 1) high-sensitivity image generation mode,
(mode 2) HDR image generation mode, and
(mode 3) high-resolution (super-resolution) image generation mode.

The signal processing unit 122 receives the input of this user selection information via the control unit 150 and executes the signal processing according to the selection mode.

Figure 12:
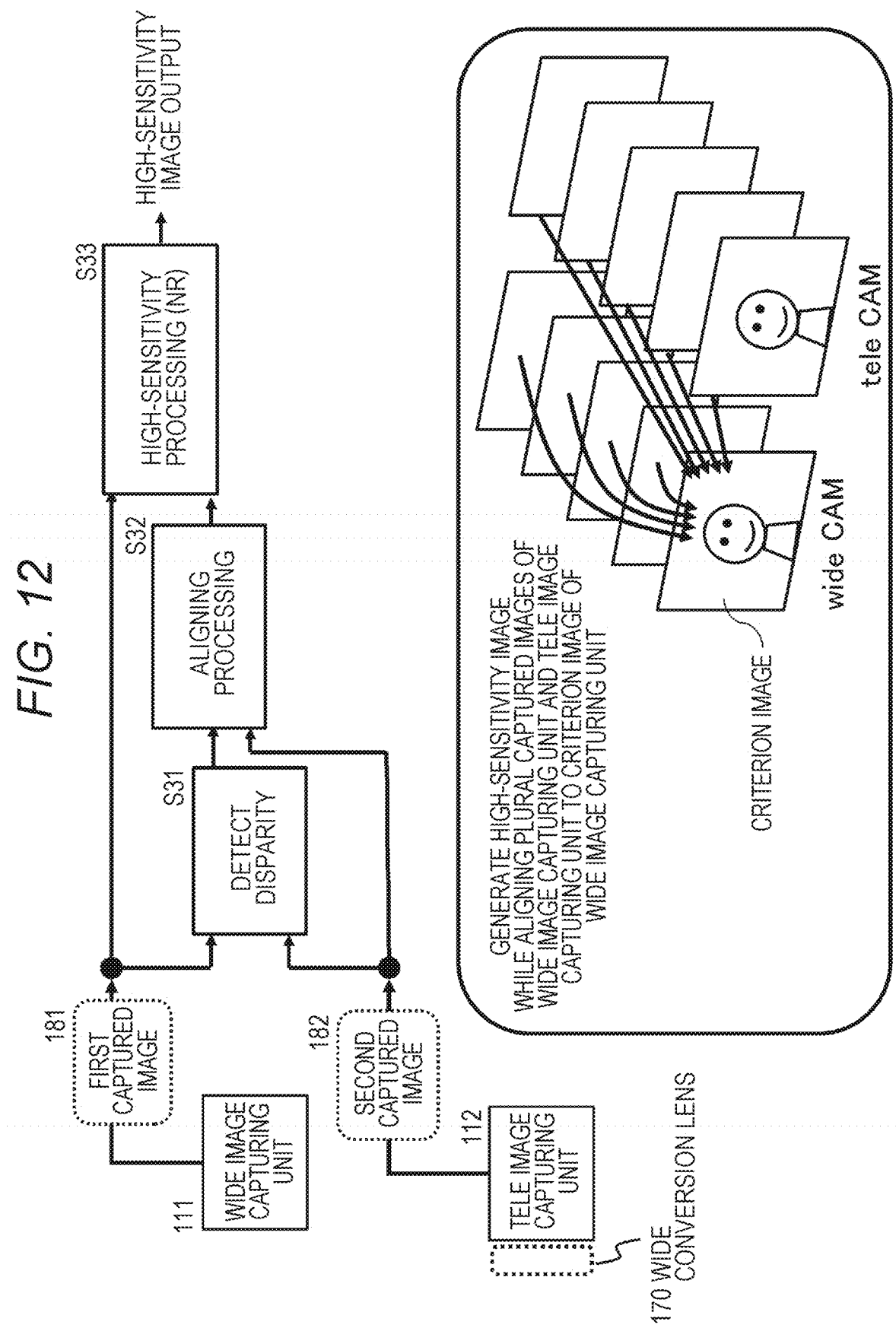
FIG. 12 is a view for illustrating an example of high-sensitivity image generation processing executed by a signal processing unit.

Next, with reference to FIG. 12 and subsequent drawings, the signal processing according to each mode executed by the signal processing unit 122 is described in detail.

First, with reference to FIG. 12, the signal processing according to the (mode 1) high-sensitivity image generation mode is described.

In FIG. 12, time-series processing steps executed by the signal processing unit 122 in the (mode 1) high-sensitivity image generation mode are illustrated as steps S31 to S33. Hereinafter, the process at each step is sequentially described.

(Step S31)

First, at step S31, the signal processing unit 122 receives the input of the captured image of the wide image capturing unit 111 and the captured image of the tele image capturing unit 112 to which the wide conversion lens 170 is attached and detects the disparity between the respective images.

Note that the images to be processed include a plurality of (n) image frames continuously captured by the wide image capturing unit 111 and a plurality of (n) image frames continuously captured by the tele image capturing unit 112 to which the wide conversion lens 170 is attached at the same timing.

For example, as illustrated in a lower portion of FIG. 12, a leading image of the plurality of (n) image frames continuously captured by the wide image capturing unit 111 is set as a criterion image. At step S31, disparity between this criterion image and another image, that is, n−1 other images captured by the wide image capturing unit 111 and n images continuously captured by the tele image capturing unit 112 is detected.

(Step S32)

Next, image aligning processing of allowing an image position of an image other than the criterion image to coincide with an image position of the criterion image according to the disparity between the criterion image and the other image detected at step S31 is executed.

By this processing, 2n images obtained by imaging the same subject may be obtained.

(Step S33)

Next, at step S33, high-sensitivity processing such as noise reduction (NR) processing is executed using the 2n images obtained by imaging the same subject generated at step S32 to generate the high-sensitivity image obtained by reducing noise included in pixels forming the image to output.

Note that the high-sensitivity image generation processing may be performed according to the processing disclosed in Patent Document 3 (Japanese Patent Laid-Open No. 2011-199716) described above, for example.

Figure 13:
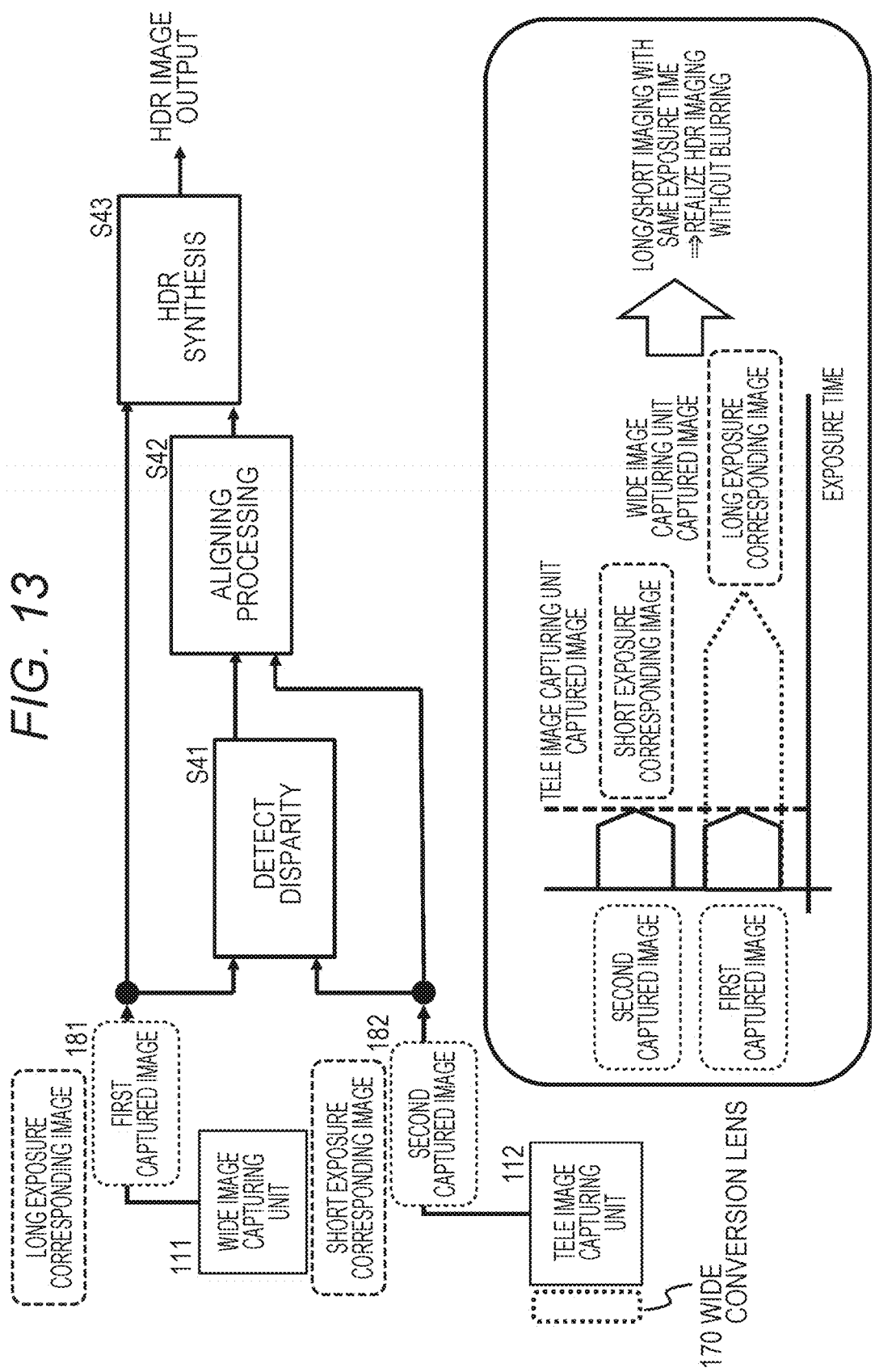
FIG. 13 is a view for illustrating an example of HDR image generation processing executed by the signal processing unit.

Next, with reference to FIG. 13, the signal processing according to the (mode 2) HDR image generation mode is described.

In FIG. 13, time-series processing steps executed by the signal processing unit 122 in the (mode 2) HDR image generation mode are illustrated as steps S41 to S43. Hereinafter, the process at each step is sequentially described.

(Step S41)

First, at step S41, the signal processing unit 122 receives the input of the captured image of the wide image capturing unit 111 and the captured image of the tele image capturing unit 112 to which the wide conversion lens 170 is attached and detects the disparity between the respective images.

Note that, the images to be processed include one image frame captured by the wide image capturing unit 111 and one image frame continuously captured by the tele image capturing unit 112 to which the wide conversion lens 170 is attached at the same timing.

(Step S42)

Next, image aligning processing of setting one image as a criterion image and allowing an image position of the other image to coincide with an image position of the criterion image according to the disparity detected at step S41 is executed.

By this processing, two images obtained by imaging the same subject may be obtained.

(Step S43)

Next, at step S43, the HDR image generation processing is executed using the two images obtained by imaging the same subject generated at step S42.

In general, the HDR image generation processing is executed as processing of generating an image having wider range of pixel values from low luminance to high luminance, that is, a high dynamic range image by obtaining a long exposure image and a short exposure image obtained by imaging the same subject and using a pixel value of the short exposure image for a high-luminance portion and using a pixel value of the long exposure image for a low-luminance portion.

In the processing illustrated in FIG. 13, there is no difference in exposure time between the captured image of the wide image capturing unit 111 and the captured image of the tele image capturing unit 112 to which the wide conversion lens 170 is attached, and they are basically the captured images of the same exposure time. However, the tele image capturing unit 112 has a characteristic that sensitivity is lower than that of the wide image capturing unit 111. That is, the tele image capturing unit 112 has a characteristic that the sensitivity is lower than that of the wide image capturing unit 111 due to an F value, a pixel pitch of the sensor and the like.

On the basis of this characteristic, it may be assumed that the captured image of the tele image capturing unit 112 to which the wide conversion lens 170 is attached is an image corresponding to the short exposure image, and the captured image of the wide image capturing unit 111 is an image corresponding to the long exposure image.

On the basis of this assumption, it is possible to generate the image having wider range of pixel values from low luminance to high luminance, that is, the high dynamic range image using the pixel value of the captured image of the tele image capturing unit 112 to which the wide conversion lens 170 is attached corresponding to the short exposure image for the high-luminance portion and using the pixel value of the captured image of the wide image capturing unit 111 corresponding to the long exposure image for the low-luminance portion.

Figure 14:
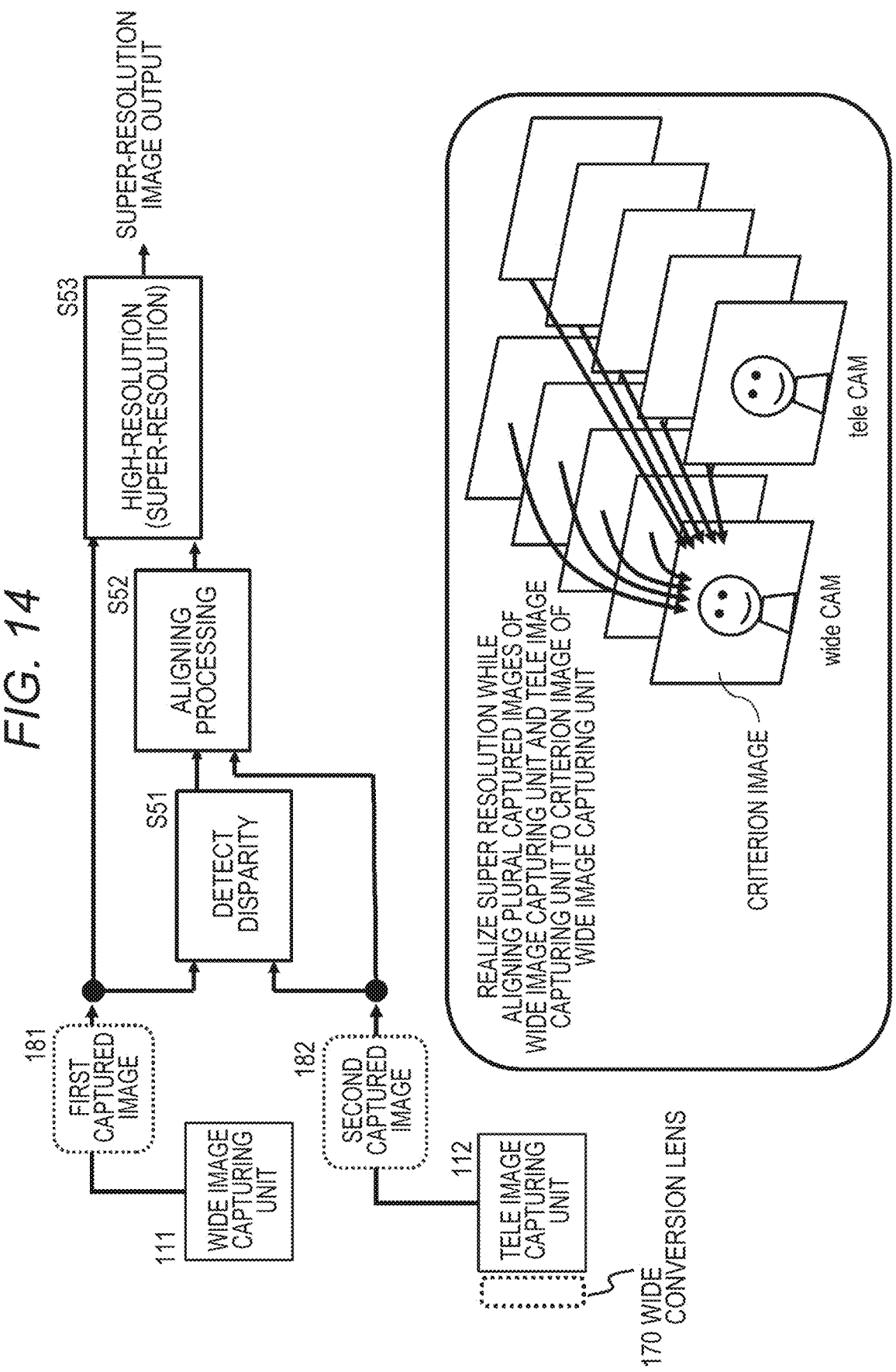
FIG. 14 is a view for illustrating an example of high-resolution image generation processing executed by the signal processing unit.

Next, with reference to FIG. 14, the signal processing according to the (mode 3) high-resolution (super-resolution) image generation mode is described.

In FIG. 14, time-series processing steps executed by the signal processing unit 122 in the (mode 3) high-resolution (super-resolution) image generation mode are illustrated as steps S51 to S53. Hereinafter, the process at each step is sequentially described.

(Step S51)

First, at step S51, the signal processing unit 122 receives the input of the captured image of the wide image capturing unit 111 and the captured image of the tele image capturing unit 112 to which the wide conversion lens 170 is attached and detects the disparity between the respective images.

Note that the images to be processed include a plurality of (n) image frames continuously captured by the wide image capturing unit 111 and a plurality of (n) image frames continuously captured by the tele image capturing unit 112 to which the wide conversion lens 170 is attached at the same timing.

For example, as illustrated in a lower portion of FIG. 12, a leading image of the plurality of (n) image frames continuously captured by the wide image capturing unit 111 is set as a criterion image. At step S31, disparity between this criterion image and another image, that is, n−1 other images captured by the wide image capturing unit 111 and n images continuously captured by the tele image capturing unit 112 is detected.

(Step S52)

Next, image aligning processing of allowing an image position of an image other than the criterion image to coincide with an image position of the criterion image according to the disparity between the criterion image and other image detected at step S51 is executed.

By this processing, 2n images obtained by imaging the same subject may be obtained.

(Step S53)

Next, at step S53, high-resolution processing is executed using the 2n images obtained by imaging the same subject generated at step S52 to generate the high-resolution (super-resolution) image obtained by improving resolution of the image to output. That is, processing of generating a higher-resolution image than captured images using pixel information of a plurality of (2n) time-series continuous captured images captured by two cameras is executed.

Note that the high-resolution (super-resolution) image generation processing may be performed according to the processing disclosed in Patent Document 2 (Japanese Patent Laid-Open No. 2010-170340) described above, for example.

[6. Regarding Sequence of Processing Executed by Image Processing Device]

Next, a sequence of processing executed by the image processing device 100 of the present disclosure is described with reference to a flowchart illustrated in FIG. 15.

Note that the processing according to this flow may be executed according to a program stored in the storage unit of the image processing device 100 and may be executed as program execution processing by a processor such as a CPU having a program execution function, for example.

Figure 15:
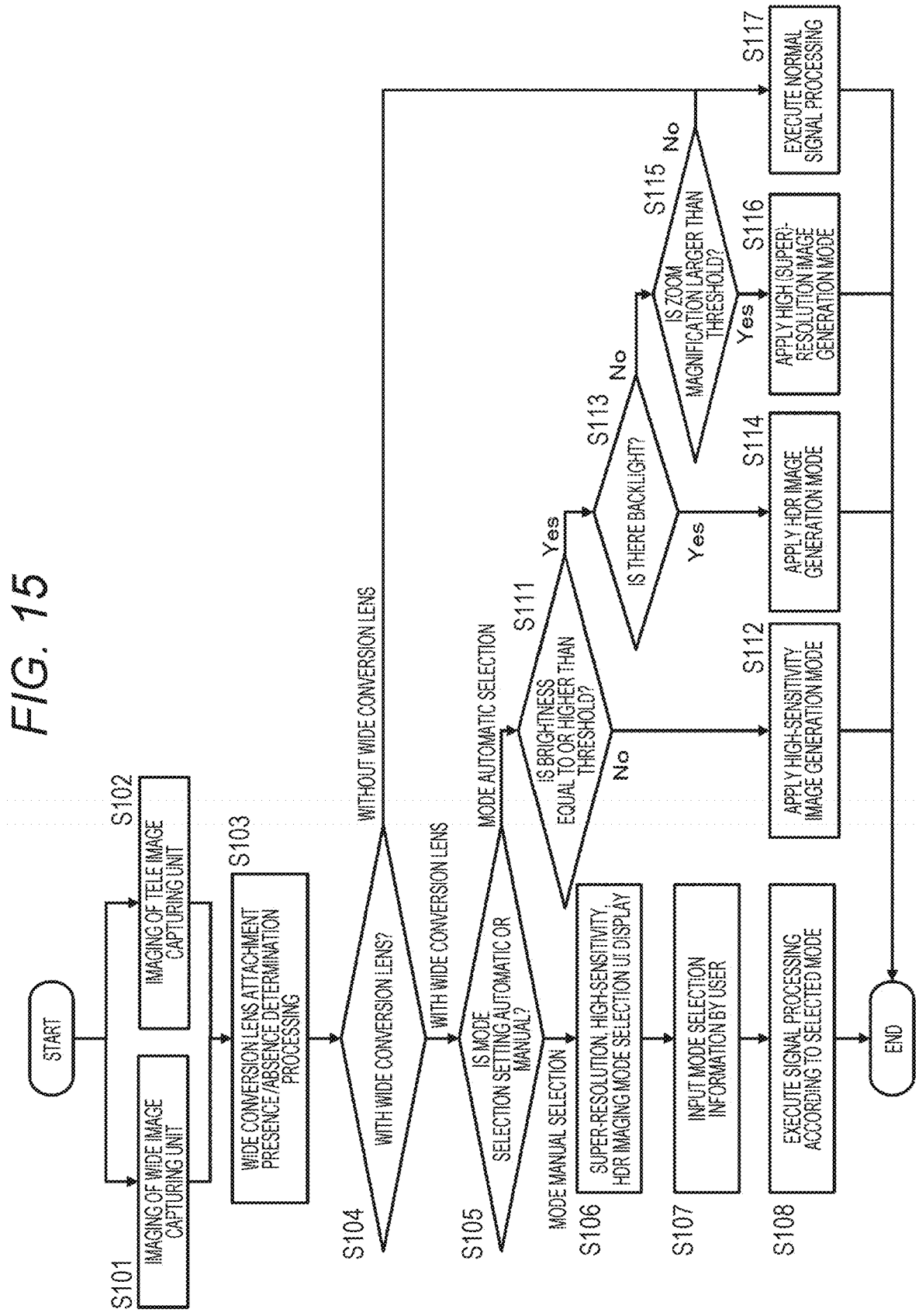
FIG. 15 is a view illustrating a flowchart for illustrating a sequence of processing executed by the image processing device.

A process at each step illustrated in the flowchart in FIG. 15 is described below.

(Steps S101-S102)

First, at steps S101 to S102, the wide image capturing unit 111 and the tele image capturing unit 112 capture images.

Note that there is a case where the wide conversion lens 170 is attached to the tele image capturing unit 112 and a case where the wide conversion lens 170 is not attached to the tele image capturing unit 112.

(Steps S103-S104)

Next, at step S103, determination processing of determining whether or not the wide conversion lens 170 is attached to the tele image capturing unit 112 is executed.

This processing is the processing described above with reference to FIGS. 7 to 9, and is the processing executed by the wide conversion lens attachment presence/absence detection unit 121 of the image processing unit 120.

The wide conversion lens attachment presence/absence detection unit 121 of the image processing unit 120 determines whether the wide conversion lens is attached or not by comparison processing between the captured image of the wide image capturing unit 111 and the captured image of the tele image capturing unit 112.

Specifically, the determination processing on the basis of the similarity between the luminance histograms of the two captured images described above with reference to FIG. 8, the determination processing on the basis of the sum of absolute differences (SAD) and the disparity amount between the two captured images described with reference to FIG. 9 or the like are performed.

In a case where it is determined that the wide conversion lens 170 is attached to the tele image capturing unit 112 in this determination processing (determination at step S104=Yes), the procedure shifts to step S105.

In contrast, in a case where it is determined that the wide conversion lens 170 is not attached to the tele image capturing unit 112 (determination at step S104=No), the procedure shifts to step S117.

(Step S105)

At step S104, in a case where it is determined that the wide conversion lens 170 is attached to the tele image capturing unit 112, the procedure shifts to step S105.

At step S105, it is determined whether the mode selection setting is "optimal mode automatic selection setting" or "mode manual selection setting".

Note that this setting is a setting made by the user in advance.

Note that the mode is the mode of the signal processing executed by the signal processing unit 122 in a case where the wide conversion lens is attached, and includes the following three modes:

(mode 1) high-sensitivity image generation mode,
(mode 2) HDR image generation mode, and
(mode 3) high-resolution (super-resolution) image generation mode.

In a case of "optimal mode automatic selection setting", the signal processing unit 122 automatically selects the optimal mode from the above-described modes 1 to 3 according to the imaging state information (illuminance, backlight, zoom setting and the like) at the time of image capturing, and executes the processing of the selected mode.

Furthermore, in a case where the mode selection setting is "mode manual selection setting", the signal processing unit 122 executes the processing of the mode input by the user via the operation unit 142 such as the UI, that is, the mode selected by the user from the modes 1 to 3.

At step S105, first, it is determined whether the mode selection setting is "optimal mode automatic selection setting" or "mode manual selection setting".

In a case where the mode selection setting is "optimal mode automatic selection setting", the procedure shifts to step S111.

In contrast, in a case where the mode selection setting is "mode manual selection setting", the procedure shifts to step S106.

(Step S106)

At step S105, in a case where it is determined that the mode selection setting is "mode manual selection setting", the procedure shifts to step S106.

At step S106, first, the UI for allowing the user to select the mode, that is, the UI described above with reference to FIG. 11 is displayed on the display unit.

As described above with reference to FIG. 11, the user may select any one of the following three modes via the UI:

(mode 1) high-sensitivity image generation mode,
(mode 2) HDR image generation mode, and
(mode 3) high-resolution (super-resolution) image generation mode.

The user may freely select the mode from these three modes.

(Step S107)

At step S107, mode selection information of the user is input via the UI, that is, the operation unit 142.

This input information is input to the signal processing unit 122 via the control unit 150.

(Step S108)

Next, at step S108, the signal processing unit 122 executes the signal processing according to the mode selected by the user. That is, the processing according to any one of the following modes is executed:

(mode 1) high-sensitivity image generation mode,
(mode 2) HDR image generation mode, and
(mode 3) high-resolution (super-resolution) image generation mode.

Note that the signal processing according to each of these modes is the signal processing described above with reference to FIGS. 12 to 14.

(Step S111)

In contrast, at step S105, in a case where the mode selection setting is "optimal mode automatic selection setting", the procedure shifts to step S111.

The processing at step S111 and subsequent steps is the processing executed by the signal processing unit 122.

The signal processing unit 122 selects the optimal mode out of the following modes according to the imaging state information (illuminance, backlight, zoom setting and the like) at the time of image capturing input via the control unit 150:

(mode 1) high-sensitivity image generation mode,
(mode 2) HDR image generation mode, and
(mode 3) high-resolution (super-resolution) image generation mode, and executes the processing according to the selected optimal mode.

Specifically, for example, optimal mode selection processing is executed according to the table described above with reference to FIG. 10.

First, at step S111, it is determined whether or not illuminance at the time of image capturing is equal to or higher than a predetermined threshold and is bright.

In a case where the illuminance at the time of image capturing is not equal to or higher than the predetermined threshold and dark, the procedure shifts to step S112.

In contrast, in a case where the illuminance at the time of image capturing is equal to or higher than the predetermined threshold and bright, the procedure shifts to step S113.

(Step S112)

At step S111, in a case where it is determined that the illuminance at the time of image capturing is not equal to or higher than the predetermined threshold and dark, the procedure shifts to step S112.

At step S112, the signal processing unit 122 executes the high-sensitivity image generation processing.

This is the processing corresponding to entry (a1) illustrated in FIG. 10.

The high-sensitivity image generation processing by the signal processing unit 122 is performed according to the processing sequence described above with reference to FIG. 12.

(Step S113)

In contrast, at step S111, in a case where it is determined that the illuminance at the time of image capturing is equal to or higher than the predetermined threshold and bright, the procedure shifts to step S113.

At step S113, it is determined whether or not there is backlight at the time of image capturing.

In a case where it is determined that there is backlight, the procedure shifts to step S114, and in a case where it is determined that there is no backlight, the procedure shifts to step S115.

(Step S114)

In a case where it is determined at step S113 that there is backlight at the time of image capturing, the procedure shifts to step S114.

At step S114, the signal processing unit 122 executes the HDR image generation processing.

This is the processing corresponding to entry (a2) illustrated in FIG. 10.

The HDR image generation processing by the signal processing unit 122 is performed according to the processing sequence described above with reference to FIG. 13.

(Step S115)

In contrast, in a case where it is determined at step S113 that there is no backlight at the time of image capturing, the procedure shifts to step S115.

At step S115, it is determined whether or not the zooming operation at the time of image capturing, specifically, the zoom magnitude setting at the time of image capturing is equal to or larger than the threshold (for example, 1.0).

In a case where it is determined that the zoom magnification setting is equal to or larger than the threshold (for example, 1.0), the procedure shifts to step S116, and in a case where it is determined that this is smaller than the threshold, the procedure shifts to step S117.

(Step S116)

At step S115, in a case where it is determined that the zoom magnification setting at the time of image capturing is equal to or larger than the threshold (for example, 1.0), the procedure shifts to step S116.

At step S116, the signal processing unit 122 executes the high-resolution (super-resolution) image generation processing.

This is the processing corresponding to entry (a3) illustrated in FIG. 10.

The high-resolution (super-resolution) image generation processing by the signal processing unit 122 is performed according to the processing sequence described above with reference to FIG. 14.

(Step S117)

In a case where it is determined at step S115 that the zoom magnification setting at the time of image capturing is smaller than the threshold (for example, 1.0), and in a case where it is determined at step S104 that the wide conversion lens is not attached, the procedure shifts to step S117.

At step S117, the signal processing unit 122 does not generate a high-sensitivity image, a HDR image, and a super-resolution image, but performs image processing for normal captured image, specifically, performs image processing by selecting the captured image of the wide image capturing unit 111 or the captured image of the tele image capturing unit 112 according to a zooming operation and generates one output image to output.

[7. Regarding Embodiment of Executing Measurement Processing of Subject Distance]

Next, an embodiment of measuring the subject distance (depth) using the captured image of the image processing device 100, that is, the captured image of the wide image capturing unit 111 and the captured image of the tele image capturing unit 112 to which the wide conversion lens 170 is attached is described.

FIG. 16 illustrates a table illustrating a processing aspect of subject distance calculation processing executed by the signal processing unit 122 in following two cases:

(A) a case where the wide conversion lens 170 is attached, and (B) a case where the wide conversion lens 170 is not attached to the tele image capturing unit 112.

A distance (depth) measuring range (measurable range) illustrated in FIG. 16(2) is described.

(A) In a case where the wide conversion lens 170 is attached, the captured image of the wide image capturing unit 111 and the captured image of the tele image capturing unit 112 are the images of the same viewing angle having substantially the same visual fields. The setting is similar to the setting illustrated in FIG. 3B described above. In this case, image data from different viewpoints may be obtained for an entire image region of the captured images by the two imaging units, and the disparity of each pixel may be calculated. Since the subject distance is calculated on the basis of the disparity, in a case where the wide conversion lens 170 is attached, the measurable range of the subject distance is a visual field range corresponding to an imaging viewing angle of the wide image capturing unit 111.

In contrast, (B) in a case where the wide conversion lens 170 is not attached, the captured image of the wide image capturing unit 111 and the captured image of the tele image capturing unit 112 have different visual fields; the captured image of the tele image capturing unit 112 is the image of a narrow viewing angle having a visual field range narrower than that of the captured image of the wide image capturing unit 111. That is, the setting is similar to the setting illustrated in FIG. 3A described above. In this case, the pixel for which the disparity may be calculated is a region where the two images overlap, that is, a narrow region corresponding to the imaging viewing angle of the captured image of the tele image capturing unit 112.

Next, correction of standard calibration data illustrated in FIG. 16(3) or selection of optimal calibration data is described.

When calculating the disparity between corresponding points of the captured images of the two imaging units at different positions to obtain the subject distance, calibration processing is required to reduce a measurement error based on a difference in characteristic between the two imaging units. That is, a sequence in a case of measuring the subject distance (depth) is as follows:

(S1) calculation of calibration data which resolves the difference in characteristic between the two imaging units, (S2) imaging processing of the two images by the two imaging units at different positions, (S3) correction processing to at least one of the two captured images obtained at S2 by applying the calibration data calculated at S1, and (S4) calculation of the subject distance (depth) by detecting the disparity between the corresponding points of the two images by applying the correction image at S3.

In general, in a case of measuring a subject distance (depth) using a compound eye camera including two fixed imaging units, calibration data is invariable, so that it is possible to calculate one "standard calibration data" in advance to store in a storage unit in a device and sequentially read out the same to use when calculating the distance.

However, in a configuration in which the wide conversion lens 170 is attachable to and detachable from the tele image capturing unit 112 as in the configuration of the present disclosure, it is assumed that an attaching position of the wide conversion lens 170 is slightly shifted. In this case, accurate disparity detection and subject distance (depth) calculation cannot be performed without calculating and using the calibration data according to the attaching position of the wide conversion lens 170. That is, even if one fixed "standard calibration data" corresponding to the two fixed imaging units is used, accurate distance calculation cannot be performed.

In FIG. 16 (3), the correction of the standard calibration data or the selection of the optimal calibration data in the following two cases is described:

(A) a case where the wide conversion lens 170 is attached, and (B) a case where the wide conversion lens 170 is not attached.

(B) In a case where the wide conversion lens 170 is not attached, the wide image capturing unit 111 and the tele image capturing unit 112 to which the wide conversion lens 170 is not attached are the two fixed imaging units and the calibration data is invariable, so that it is possible to use one "standard calibration data" calculated in advance.

In contrast, (A) in a case where the wide conversion lens 170 is attached, the wide image capturing unit 111 and the tele image capturing unit 112 to which the wide conversion lens 170 is attached are not the two fixed imaging units. That is, it is assumed that the attaching position of the wide conversion lens 170 is shifted, and it is necessary to use the calibration data according to the attaching position.

That is, as illustrated in FIG. 16(3), it is necessary to correct the standard calibration data or select the optimal calibration data.

Figure 17:
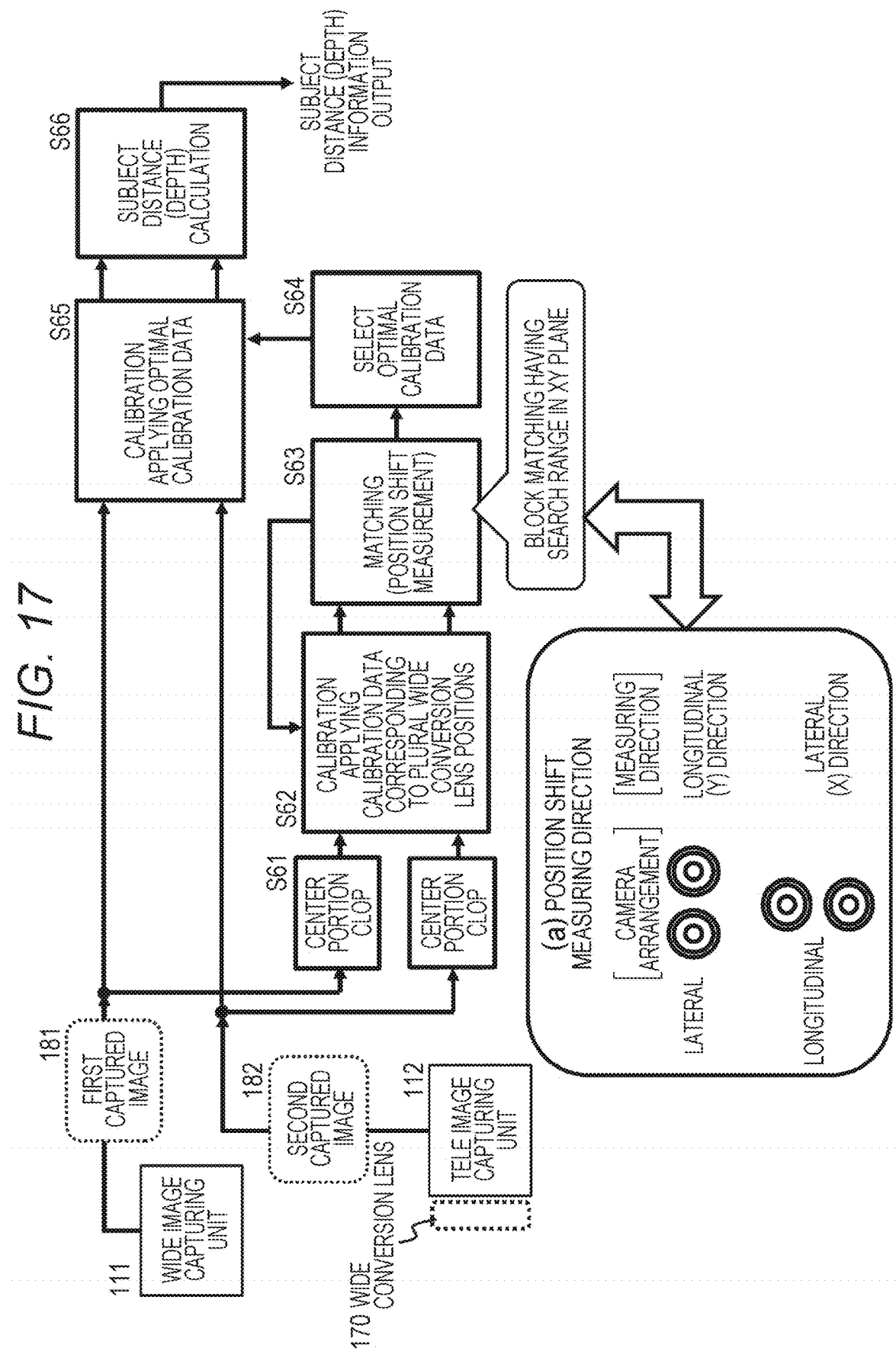
FIG. 17 is a view for illustrating an example of subject distance calculation processing executed by the signal processing unit.

With reference to FIG. 17, processing executed by the signal processing unit 122 in a case where the wide conversion lens 170 is attached to the tele image capturing unit 112 is described.

In FIG. 17, time-series processing steps executed by the signal processing unit 122 are illustrated as steps S61 to S66. Hereinafter, the process at each step is sequentially described.

(Step S61)

First, at step S61, the signal processing unit 122 receives the input of the captured image of the wide image capturing unit 111 and the captured image of the tele image capturing unit 112 to which the wide conversion lens 170 is attached and clops (cuts) only a center portion of each image. Ends of the two images captured from two different viewpoints include a subject imaged only in one image. Since disparity detection and subject distance calculation cannot be performed on such an image region, this is executed as processing of deleting such region.

Note that the images to be processed include the captured image of the wide image capturing unit 111 and the image captured by the tele image capturing unit 112 to which the wide conversion lens 170 is attached at the same timing.

(Steps S62 to S64)

Next, at step S62, calibration processing applying a plurality of calibration data corresponding to a plurality of different wide conversion lens attaching positions is executed.

Note that the plurality of calibration data corresponding to the plurality of different wide conversion lens attaching positions is calculated in advance and stored in the storage unit.

At step S63, corresponding point matching is performed using a corrected image after the calibration executed at step S62, and a shift amount is calculated. Note that the process at step S63 is the process executed for selecting the optimal calibration data corresponding to an actual wide conversion lens attaching position at step S64, and the process of calculating a shift amount of the corresponding points in a direction not affected by the disparity. At step S64, the calibration data with the smallest shift amount is selected as the optimal calibration data.

At step S63, it is necessary to calculate the shift amount between the corresponding points in a direction not affected by the disparity, and the correction points are searched for while setting a search range (shift measuring direction) in a direction perpendicular to a direction of camera arrangement, that is, a direction in which the wide image capturing unit 111 and the tele image capturing unit 112 to which the wide conversion lens 170 is attached are arranged as illustrated in (a) position shift measuring direction in a lower portion in FIG. 17, and the shift amount of the corresponding points between the two images is calculated.

Note that it is only required that this shift amount calculation processing be executed using only a part in the vicinity of the center portions of the two images.

At step S64, the calibration data with the smallest shift amount calculated at step S63 is selected as the optimal calibration data. The selected calibration data is selected as the calibration data optimal for a current wide conversion lens attaching position.

(Step S65)

Next, at step S65, using the optimal calibration data selected at step S64, calibration processing of the images captured by the two imaging units, that is, image correction processing for resolving the characteristic of the imaging units is executed.

(Step S66)

Finally, at step S66, the two images after the calibration at step S65 are used to calculate the disparity between the corresponding points between the two images, and the subject distance (depth) is calculated on the basis of the calculated disparity.

Note that the processing of searching for the corresponding points between the two images may be executed by, for example, block matching processing in a predetermined pixel block unit.

As the block matching, for example, the sum of squared differences (SSD) calculated according to following (expression 2a), the sum of absolute differences (SAD) calculated according to following (expression 2b) or the like is applicable as a matching evaluation value.

[Mathematical expression 2]

$$\in = \int_w [J(x+d)-I(x)]^2 dx \quad \text{(EXPRESSION 2a)}$$

$$\in = \int_w |J(x+d)-I(x)| dx \quad \text{(EXPRESSION 2b)}$$

Note that in (expression 2a) and (expression 2b) described above, each parameter has the following meaning:
w: searching region,
J: reference pixel,
I: criterion image,
x: coordinate, and
d: displacement amount (vector).

Next, a sequence of the subject distance calculation processing executed by the image processing device 100 is described with reference to a flowchart illustrated in FIG. 18.

Note that the processing according to this flow may be executed according to a program stored in the storage unit of the image processing device 100 and may be executed as program execution processing by a processor such as a CPU having a program execution function, for example.

The process at each step illustrated in the flowchart in FIG. 18 is described below.

(Steps S201 to S202)

First, at steps S201 to S202, the wide image capturing unit 111 and the tele image capturing unit 112 capture images.

Note that there is a case where the wide conversion lens 170 is attached to the tele image capturing unit 112 and a case where the wide conversion lens 170 is not attached to the tele image capturing unit 112.

(Steps S203 to S204)

Next, at step S203, determination processing of determining whether or not the wide conversion lens 170 is attached to the tele image capturing unit 112 is executed.

This processing is the processing described above with reference to FIGS. 7 to 9, and is the processing executed by the wide conversion lens attachment presence/absence detection unit 121 of the image processing unit 120.

The wide conversion lens attachment presence/absence detection unit 121 of the image processing unit 120 determines whether the wide conversion lens is attached or not by comparison processing between the captured image of the wide image capturing unit 111 and the captured image of the tele image capturing unit 112.

Specifically, the determination processing on the basis of the similarity between the luminance histograms of the two captured images described above with reference to FIG. 8, the determination processing on the basis of the sum of absolute differences (SAD) and the disparity amount between the two captured images described with reference to FIG. 9 or the like are performed.

In this determination processing, in a case where it is determined that the wide conversion lens 170 is attached to the tele image capturing unit 112 (determination at step S204=Yes), the procedure shifts to step S211.

In contrast, in a case where it is determined that the wide conversion lens 170 is not attached to the tele image capturing unit 112 (determination at step S104=No), the procedure shifts to step S205.

(Step S205)

In a case where it is determined that the wide conversion lens 170 is not attached to the tele image capturing unit 112 at step S204, the procedure shifts to step S205.

At step S205, the calibration processing applying the standard calibration data is executed.

The standard calibration data is the calibration data calculated in advance corresponding to the two fixed imaging units, that is, the two fixed imaging units of the wide image capturing unit 111 and the tele image capturing unit 112 to which the wide conversion lens 170 is not attached. This standard calibration data is stored in advance in the storage unit of the image processing device.

(Step S206)

Next, at step S206, the two images after the calibration applying the standard calibration data at step S205 are used to calculate the disparity between the corresponding points between the two images, and the subject distance (depth) is calculated on the basis of the calculated disparity.

Note that, the processing of searching for the corresponding points between the two images may be executed by, for example, the block matching processing in a predetermined pixel block unit as described above, and the sum of squared differences (SSD), the sum of absolute differences (SAD) or the like described above may be applied as the matching evaluation value.

(Step S211)

In contrast, in a case where it is determined that the wide conversion lens 170 is attached to the tele image capturing unit 112 at step S204, the procedure shifts to step S211.

At step S211, only the center portion of each of the captured image of the wide image capturing unit 111 and the captured image of the tele image capturing unit 112 to which the wide conversion lens 170 is attached is clopped (cut).

(Steps S212 to 214)

Next, at step S212, the calibration processing applying a plurality of calibration data corresponding to a plurality of different wide conversion lens attaching positions is executed. Note that the plurality of calibration data is calculated in advance and stored in the storage unit.

At step S213, corresponding point matching is performed using the corrected images after the calibration executed at step S212, and the shift amount is calculated. Note that the processing is the processing for selecting the optimal calibration data corresponding to an actual wide conversion lens attaching position, and the processing is for calculating the shift amount between the corresponding points in the direction not affected by the disparity.

At step S214, the calibration data with the smallest shift amount calculated at step S213 is selected as the optimal calibration data. The selected calibration data is selected as the calibration data optimal for a current wide conversion lens attaching position.

(Step S215)

Next, at step S215, using the optimal calibration data selected at step S214, calibration processing of the images captured by the two imaging units, that is, image correction processing for resolving the characteristic of the imaging units is executed.

(Step S206)

Finally, at step S206, the two images after the calibration at step S215 are used to calculate the disparity between the corresponding points between the two images, and the subject distance (depth) is calculated on the basis of the calculated disparity.

Note that, the processing of searching for the corresponding points between the two images may be executed by, for example, the block matching processing in a predetermined pixel block unit as described above, and the sum of squared differences (SSD), the sum of absolute differences (SAD) or the like described above may be applied as the matching evaluation value.

[8. Summary of Configuration of Present Disclosure]

The embodiment of the present disclosure is described above in detail with reference to the specific embodiment. However, it is obvious that one skilled in the art may modify or substitute the embodiment without departing from the gist of the present disclosure. That is, the present invention is disclosed in the form of exemplification and this should not be interpreted in a limited manner. In order to determine the gist of the present disclosure, claims should be taken into consideration.

Note that the technology disclosed in this specification may take the following configurations.

(1) An image processing device including:

a wide image capturing unit that captures an image of a wide viewing angle;

a tele image capturing unit that captures an image of a narrower viewing angle than the viewing angle of the wide image capturing unit; and an image processing unit that receives an input of captured images of the wide image capturing unit and the tele image capturing unit and executes signal processing, in which the image processing unit includes a wide conversion lens attachment detection unit that detects whether or not a wide conversion lens capable of capturing an image of substantially the same viewing angle as the viewing angle of the wide image capturing unit is attached to the tele image capturing unit, and a signal processing unit that executes different signal processing according to a detection result of the wide conversion lens attachment detection unit.

(2) The image processing device according to (1), in which, in a case where the wide conversion lens is attached to the tele image capturing unit, the signal processing unit executes any one of high-sensitivity image generation processing, high dynamic range (HDR) image generation processing, or high-resolution image generation processing based on the captured images of the wide image capturing unit and the tele image capturing unit according to a situation at the time of image capturing.

(3) The image processing device according to (1) or (2), in which, in a case where the wide conversion lens is attached to the tele image capturing unit, the signal processing unit executes any one of high-sensitivity image generation processing, high dynamic range (HDR) image generation processing, or high-resolution image generation processing based on the captured images of the wide image capturing unit and the tele image capturing unit according to mode setting information of a user.

(4) The image processing device according to any one of (1) to (3), in which the wide conversion lens attachment detection unit receives an input of the captured images of the wide image capturing unit and the tele image capturing unit, calculates similarity between the respective imaging units and determines whether or not the wide conversion lens is attached to the tele image capturing unit on the basis of the calculated similarity.

(5) The image processing device according to (4), in which the wide conversion lens attachment detection unit uses a luminance histogram or a sum of absolute differences (SAD) as an index value of the similarity.

(6) The image processing device according to any one of (1) to (5), in which, in a case where the wide conversion lens is attached to the tele image capturing unit, the signal processing unit receives an input of illuminance information, backlight presence/absence information, and zoom setting information as imaging state information at the time of image capturing and executes any one of high-sensitivity image generation processing, high dynamic range (HDR) image generation processing, or high-resolution image generation processing based on the captured images of the wide image capturing unit and the tele image capturing unit according to input information.

(7) The image processing device according to any one of (1) to (6), in which, in a case where the wide conversion lens is attached to the tele image capturing unit, and illuminance at the time of image capturing is lower than a predetermined threshold, the signal processing unit executes high-sensitivity image generation processing based on the captured images of the wide image capturing unit and the tele image capturing unit.

(8) The image processing device according to any one of (1) to (7), in which, in a case where the wide conversion lens is attached to the tele image capturing unit, and illuminance at the time of image capturing is equal to or higher than a predetermined threshold, and it is determined that there is backlight, the signal processing unit executes HDR image generation processing based on the captured images of the wide image capturing unit and the tele image capturing unit.

(9) The image processing device according to any one of (1) to (8), in which, in a case where the wide conversion lens is attached to the tele image capturing unit, and illuminance at the time of image capturing is equal to or higher than a predetermined threshold, there is no backlight, and zoom magnification is equal to or larger than a predetermined threshold, the signal processing unit executes high-resolution image generation processing based on the captured images of the wide image capturing unit and the tele image capturing unit.

(10) The image processing device according to any one of (1) to (9), in which the signal processing unit executes subject distance calculation processing based on the captured images of the wide image capturing unit and the tele image capturing unit.

(11) The image processing device according to any one of (1) to (10), in which, in a case where the wide conversion lens is attached to the tele image capturing unit, the signal processing unit selects optimal calibration data according to an attaching position of the wide conversion lens, and executes calibration processing based on the selected optimal calibration data to execute subject distance calculation processing based on the captured images of the wide image capturing unit and the tele image capturing unit.

(12) An image processing method executed in an image processing device, the method executing:

a step of capturing an image by each of a wide image capturing unit that captures an image of a wide viewing angle and a tele image capturing unit that captures an image of a narrower viewing angle than the viewing angle of the wide image capturing unit; and an image processing step in which the image processing unit receives an input of captured images of the wide image capturing unit and the tele image capturing unit and executes signal processing, in which the image processing step executes wide conversion lens attachment detection processing of detecting whether or not a wide conversion lens capable of capturing an image of substantially the same viewing angle as the viewing angle of the wide image capturing unit is attached to the tele image capturing unit, and different signal processing according to a result of the wide conversion lens attachment detection.

(13) A program that allows an image processing device to execute image processing, the program allowing the image processing device to execute:

a step of capturing an image by each of a wide image capturing unit that captures an image of a wide viewing angle and a tele image capturing unit that captures an image of a narrower viewing angle than the viewing angle of the wide image capturing unit; and an image processing step in which an image processing unit receives an input of captured images of the wide image capturing unit and the tele image capturing unit and executes signal processing, in which, at the image processing step, a wide conversion lens attachment detection processing of detecting whether or not a wide conversion lens capable of capturing an image of substantially the same viewing angle as the viewing angle of the wide image capturing unit is attached to the tele image capturing unit, and different signal processing according to a result of the wide conversion lens attachment detection are executed.

Furthermore, the series of processing described in the specification may be executed by hardware, software, or a composite configuration of both. In a case where the processing by the software is executed, a program in which a processing sequence is recorded may be installed in a memory in a computer incorporated in dedicated hardware to be executed, or a program may be installed in a general-purpose computer capable of executing various types of processing to be executed. For example, the program may be recorded in a recording medium in advance. In addition to being installed in the computer from the recording medium, the program may be received via a network such as a local area network (LAN) or the Internet and installed in a recording medium such as a built-in hard disk.

Note that the various processes described in the specification may be executed not only in time series according to the description but also in parallel or individually according to processing capability of the device which executes the process or the need. Furthermore, in the present specification, the system is a logical set configuration of a plurality of devices, and is not limited to that in which each configuration device is in the same casing.

INDUSTRIAL APPLICABILITY

As described above, according to a configuration of one embodiment of the present disclosure, a device and a method capable of generating a high-quality image similar to that of the same viewing angle compound eye camera are realized by using the captured images of the tele/wide compound eye camera.

Specifically, a wide image capturing unit which captures an image of a wide viewing angle, a tele image capturing unit which captures an image of a narrow viewing angle, and an image processing unit which receives an input of captured images of the respective imaging units and executes signal processing are included, for example. In a case where a wide conversion lens is attached to the tele image capturing unit, the image processing unit executes any one of high-sensitivity image generation processing, HDR image generation processing, or high-resolution image generation processing based on the captured images of the wide image capturing unit and the tele image capturing unit according to a situation at the time of imaging with a wide conversion lens attachment detection unit which detects whether or not the wide conversion lens is attached.

According to this configuration, a device and a method capable of generating a high-quality image similar to that of the same viewing angle compound eye camera are realized by using the captured images of the tele/wide compound eye camera.

REFERENCE SIGNS LIST

10 Image processing device
11 Display unit
12 Operation unit
21 Wide image capturing unit
22 Tele image capturing unit
31 Wide conversion lens
100 Image processing device
110 Imaging unit
111 Wide image capturing unit
112 Tele image capturing unit
120 Image processing unit
121 Wide conversion lens attachment detection unit 122 Signal processing unit
130 Output unit
131 Display unit
132 Storage unit
141 Sensor unit
142 Operation unit
150 Control unit
160 Communication unit

The invention claimed is:

1. An image processing device, comprising:
a wide image capturing image sensor configured to capture an image of a wide viewing angle;
a tele image capturing image sensor configured to capture an image of a narrower viewing angle, wherein the narrower viewing angle is narrower than a viewing angle of the wide image capturing image sensor; and
a central processing unit (CPU) configured to:
receive an input of captured images of the wide image capturing image sensor and the tele image capturing image sensor;
detect whether a wide conversion lens is attached to the tele image capturing image sensor, wherein the wide conversion lens is configured to capture an image of substantially the same viewing angle as the viewing angle of the wide image capturing image sensor; and
execute different signal processing based on a detection result of the detection whether the wide conversion lens is attached to the tele image capturing image sensor, wherein
based on attachment of the wide conversion lens to the tele image capturing image sensor, the CPU is further configured to:
receive an input of illuminance information, backlight presence/absence information, and zoom setting information as imaging state information at a time of image capturing; and
execute, based on the imaging state information, one of a high-sensitivity image generation processing, a high dynamic range (HDR) image generation processing, or a high-resolution image generation processing using the captured images of the wide image capturing image sensor and the tele image capturing image sensor.

2. The image processing device according to claim 1, wherein based on the attachment of the wide conversion lens to the tele image capturing image sensor, the CPU is further configured to execute one of the high-sensitivity image generation processing, the high dynamic range (HDR) image generation processing, or the high-resolution image generation processing using the captured images of the wide image capturing image sensor and the tele image capturing image sensor based on mode setting information of a user.

3. The image processing device according to claim 1, wherein the CPU is further configured to:
calculate similarity between a first image captured by the wide image capturing image sensor and a second image captured by the tele image capturing image sensor; and
determine whether the wide conversion lens is attached to the tele image capturing image sensor based on the calculated similarity.

4. The image processing device according to claim 3, wherein the CPU is further configured to use a luminance histogram or a sum of absolute differences (SAD) as an index value of the similarity.

5. The image processing device according to claim 1, wherein based on attachment of the wide conversion lens to the tele image capturing image sensor and illuminance at the time of image capture that is lower than a threshold value, the CPU is further configured to execute the high-sensitivity image generation processing based on the captured images of the wide image capturing image sensor and the tele image capturing image sensor.

6. The image processing device according to claim 1, wherein based on attachment of the wide conversion lens to the tele image capturing image sensor, illuminance at the time of image capture that is equal to or higher than a threshold value, and a determination that there is backlight, the CPU is further configured to execute the HDR image generation processing based on the captured images of the wide image capturing image sensor and the tele image capturing image sensor.

7. The image processing device according to claim 1, wherein based on attachment of the wide conversion lens to the tele image capturing image sensor, illuminance at the time of image capture that is equal to or higher than a threshold value, absence of backlight, and zoom magnification that is equal to or larger than a threshold value, the CPU is further configured to execute the high-resolution image generation processing based on the captured images of the wide image capturing image sensor and the tele image capturing image sensor.

8. The image processing device according to claim 1, wherein the CPU is further configured to execute subject distance calculation processing based on the captured images of the wide image capturing image sensor and the tele image capturing image sensor.

9. The image processing device according to claim 1, wherein based on attachment of the wide conversion lens to the tele image capturing image sensor, the CPU is further configured to:
select optimal calibration data based on an attaching position of the wide conversion lens;
execute calibration processing based on the selected optimal calibration data; and
execute subject distance calculation processing based on the captured images of the wide image capturing image sensor and the tele image capturing image sensor calibrated based on the calibration processing.

10. An image processing method executed in an image processing device, the method comprising:
capturing an image by each of a wide image capturing image sensor configured to capture an image of a wide viewing angle and a tele image capturing image sensor configured to capture an image of a narrower viewing angle, wherein the narrower viewing angle is narrower than a viewing angle of the wide image capturing image sensor;
receiving an input of captured images of the wide image capturing image sensor and the tele image capturing image sensor;
detecting whether a wide conversion lens is attached to the tele image capturing image sensor, wherein the wide conversion lens is configured to capture an image of substantially the same viewing angle as the viewing angle of the wide image capturing image sensor;
executing different signal processing based on a detection result of the detection whether the wide conversion lens is attached to the tele image capturing image sensor;
based on attachment of the wide conversion lens to the tele image capturing image sensor, receiving an input of illuminance information, backlight presence/absence information, and zoom setting information as imaging state information at a time of image capturing; and executing, based on the imaging state information, one of a high-sensitivity image generation processing, a high dynamic range (HDR) image generation processing, or a high-resolution image generation processing using the captured images of the wide image capturing image sensor and the tele image capturing image sensor.

11. A non-transitory computer-readable medium having stored thereon computer-executable instructions, that when executed by a processor, cause the processor to execute operations, the operations comprising:
   capturing an image by each of a wide image capturing image sensor configured to capture an image of a wide viewing angle and a tele image capturing image sensor configured to capture an image of a narrower viewing angle, wherein the narrower viewing angle is narrower than a viewing angle of the wide image capturing image sensor;
   receiving an input of captured images of the wide image capturing image sensor and the tele image capturing image sensor;
   detecting whether a wide conversion lens is attached to the tele image capturing image sensor, wherein the wide conversion lens is configured to capture an image of substantially the same viewing angle as the viewing angle of the wide image capturing image sensor;
   executing different signal processing based on a detection result of the detection whether the wide conversion lens is attached to the tele image capturing image sensor;
   based on attachment of the wide conversion lens to the tele image capturing image sensor, receiving an input of illuminance information, backlight presence/absence information, and zoom setting information as imaging state information at a time of image capturing; and
   executing, based on the imaging state information, one of a high-sensitivity image generation processing, a high dynamic range (HDR) image generation processing, or a high-resolution image generation processing using the captured images of the wide image capturing image sensor and the tele image capturing image sensor.

12. An image processing device, comprising:
   a wide image capturing image sensor configured to capture an image of a wide viewing angle;
   a tele image capturing image sensor configured to capture an image of a narrower viewing angle, wherein the narrower viewing angle is narrower than a viewing angle of the wide image capturing image sensor; and
   a central processing unit (CPU) configured to:
      receive an input of a first image captured by the wide image capturing image sensor and a second image captured by the tele image capturing image sensor;
      calculate similarity between the first image captured by the wide image capturing image sensor and the second image captured by the tele image capturing image sensor;
      detect whether a wide conversion lens is attached to the tele image capturing image sensor based on the calculated similarity, wherein the wide conversion lens is configured to capture an image of substantially the same viewing angle as the viewing angle of the wide image capturing image sensor; and
      execute different signal processing based on a detection result of the detection whether the wide conversion lens.

* * * * *